US012791304B2

(12) United States Patent
Honda

(10) Patent No.: US 12,791,304 B2
(45) Date of Patent: Nov. 10, 2026

(54) INSPECTION DEVICE

(71) Applicant: HITACHI HIGH-TECH CORPORATION, Tokyo (JP)

(72) Inventor: Toshifumi Honda, Tokyo (JP)

(73) Assignee: HITACHI HIGH-TECH CORPORATION, Tokyo (JP)

( * ) Notice: Subject to any disclaimer, the term of this patent is extended or adjusted under 35 U.S.C. 154(b) by 141 days.

(21) Appl. No.: 18/873,435

(22) PCT Filed: Jul. 7, 2022

(86) PCT No.: PCT/JP2022/026959

§ 371 (c)(1),
(2) Date: Dec. 10, 2024

(87) PCT Pub. No.: WO2024/009454

PCT Pub. Date: Jan. 11, 2024

(65) Prior Publication Data

US 2026/0259036 A1 Sep. 3, 2026

(51) Int. Cl.

*G01B 11/06* (2006.01)
*G01N 21/88* (2006.01)
*G01N 21/958* (2006.01)

(52) U.S. Cl.

CPC ..... *G01B 11/0675* (2013.01); *G01N 21/8806* (2013.01); *G01N 21/958* (2013.01);
(Continued)

(58) Field of Classification Search

CPC ................ G01B 11/0675; G01B 11/02; G01B 9/02088
See application file for complete search history.

(56) References Cited

U.S. PATENT DOCUMENTS 7,324,210 B2 * 1/2008 De Groot ............. G01B 9/0209 356/497
2007/0046953 A1 * 3/2007 De Groot ........... G01B 11/0675 356/512

(Continued)

FOREIGN PATENT DOCUMENTS

CN 101802543 A * 8/2010 ......... G01B 11/0625
CN 106152951 A * 11/2016 ......... G01B 11/0675

(Continued)

OTHER PUBLICATIONS

Search Report mailed Sep. 27, 2022 in International Application No. PCT/JP2022/026959.
Written Opinion mailed Sep. 27, 2022 in International Application No. PCT/JP2022/026959.

*Primary Examiner* — Abdullahi Nur
(74) *Attorney, Agent, or Firm* — Miles & Stockbridge, P.C.

(57) ABSTRACT

An inspection device for inspecting a sample having a surface formed of a transparent film and a non-transparent material, the inspection device including: a first optical unit configured to irradiate the sample with illumination light emitted from a light source and condense first reflected light reflected by the sample; a second optical unit configured to illuminate a reflecting mirror with the illumination light and condense second reflected light reflected by the reflecting mirror; an interference optical unit configured to cause the first reflected light and the second reflected light to interfere with each other to obtain interference light; a plurality of interference light sensors configured to detect a reflected light intensity of the interference light; and a signal processing device configured to process a detected light amount of the interference light sensor. The signal processing device identifies, based on the detected light amount of the interference light sensor and refractive indices of the transparent film and the non-transparent material, whether any coordi- (Continued)

nates of the sample indicate any of the transparent film and the non-transparent material, and measures a surface height or a film thickness of the sample at the coordinates by calculation.

12 Claims, 17 Drawing Sheets

(52) U.S. Cl.
CPC ................ *G01N 2021/8825* (2013.01); *G01N 2201/1293* (2013.01)

(56) References Cited

U.S. PATENT DOCUMENTS

| | | | | |
|---|---|---|---|---|
| 2012/0044501 A1* | 2/2012 | Oikaze | G01B 11/0675 | 356/503 |
| 2014/0293291 A1* | 10/2014 | Tang | G01B 11/0675 | 356/511 |

FOREIGN PATENT DOCUMENTS

| | | | | | |
|---|---|---|---|---|---|
| CN | 110088688 | A | * | 8/2019 | G03F 9/7088 |
| JP | H05-071923 | A | | 3/1993 | |
| JP | 2009-020448 | A | | 1/2009 | |
| JP | 2012-073204 | A | | 4/2012 | |
| JP | 2014-006242 | A | | 1/2014 | |
| WO | WO-2011083544 | A1 | * | 7/2011 | G01B 9/02025 |

* cited by examiner

[FIG. 1]
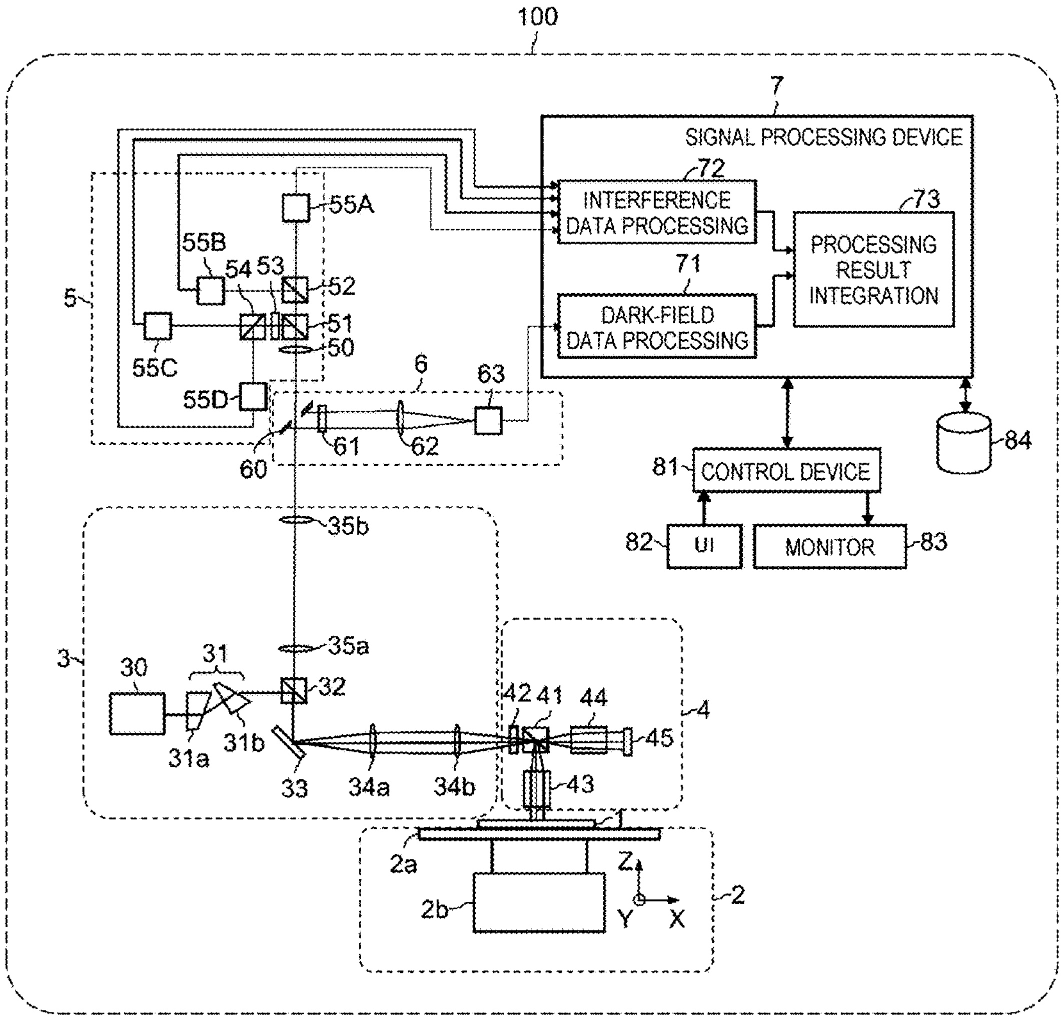
[FIG. 2]
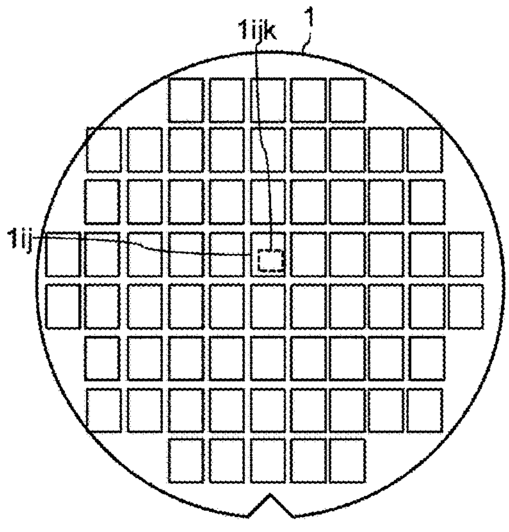

[FIG. 3]
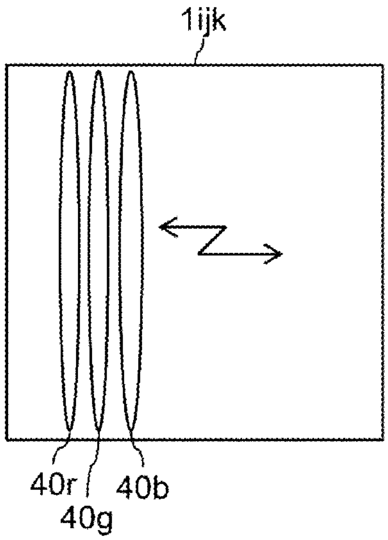
[FIG. 4]
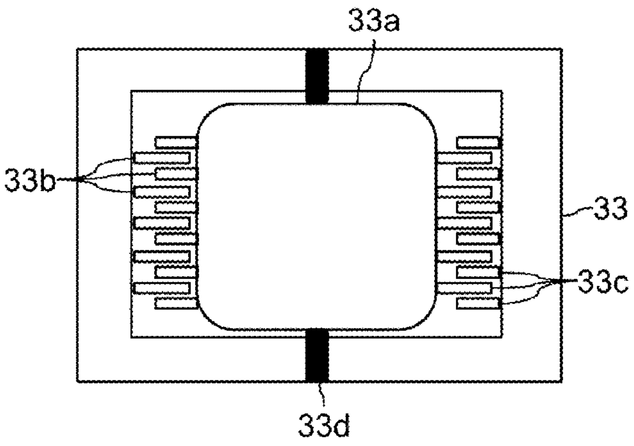

[FIG. 5]
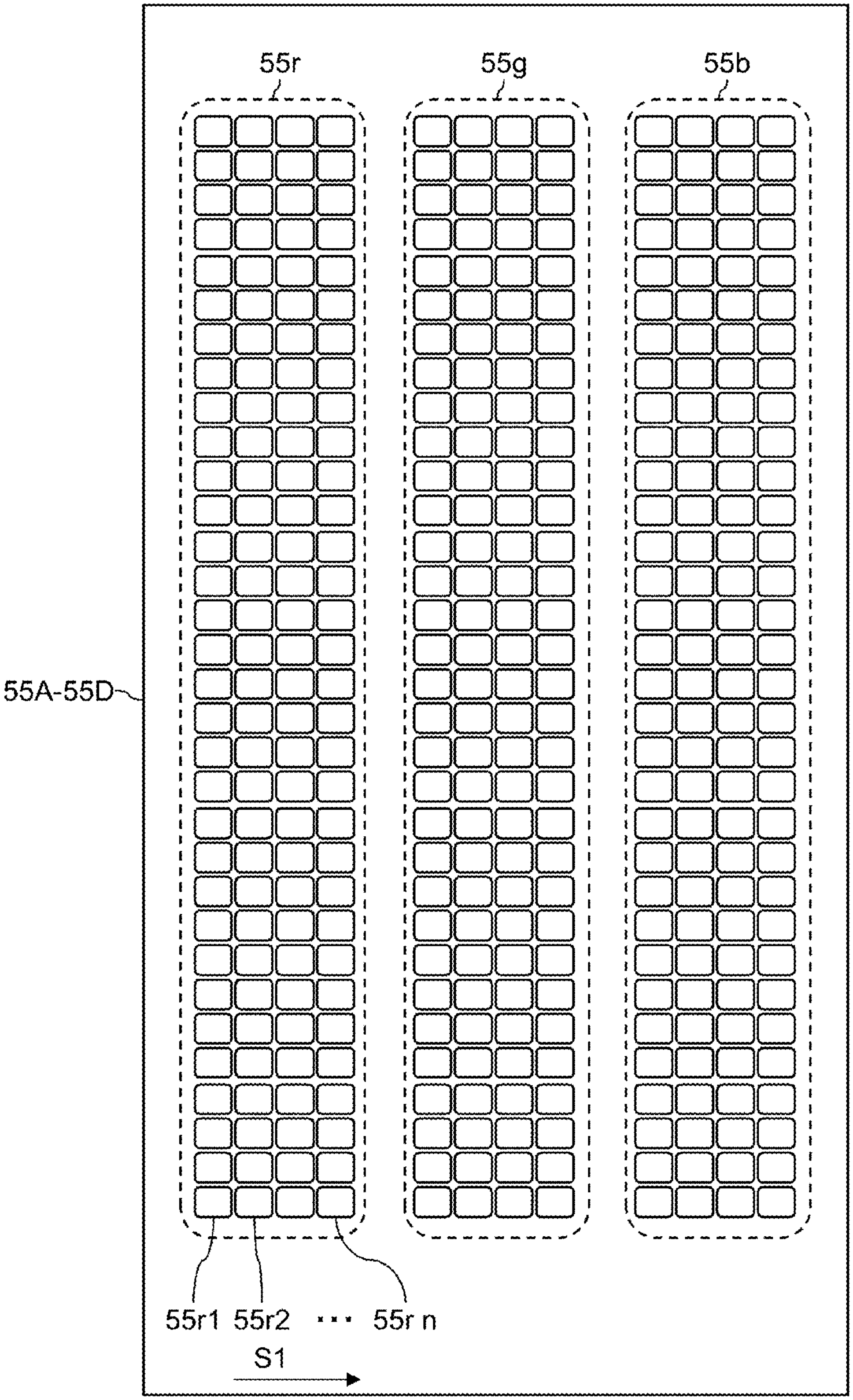

[FIG. 6]
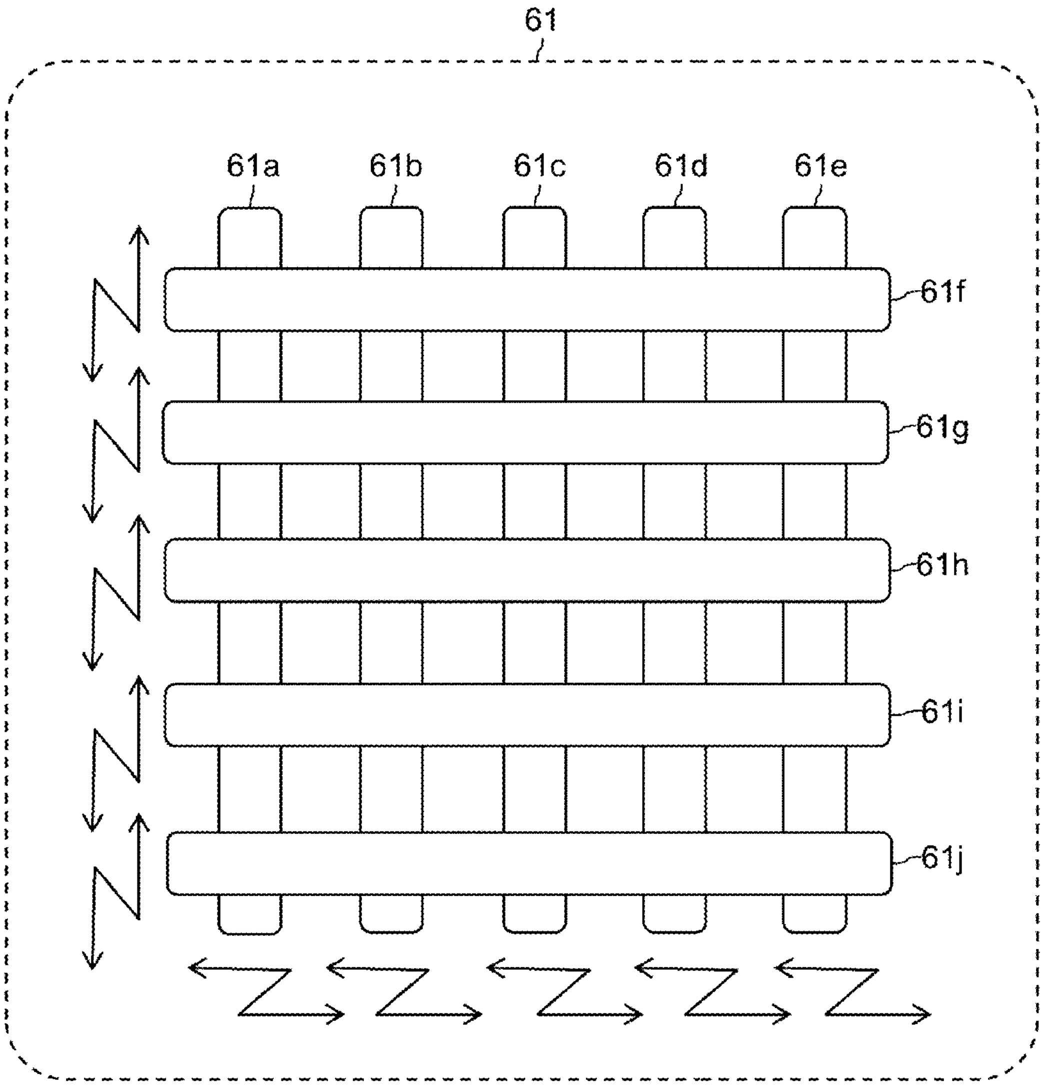

[FIG. 7]
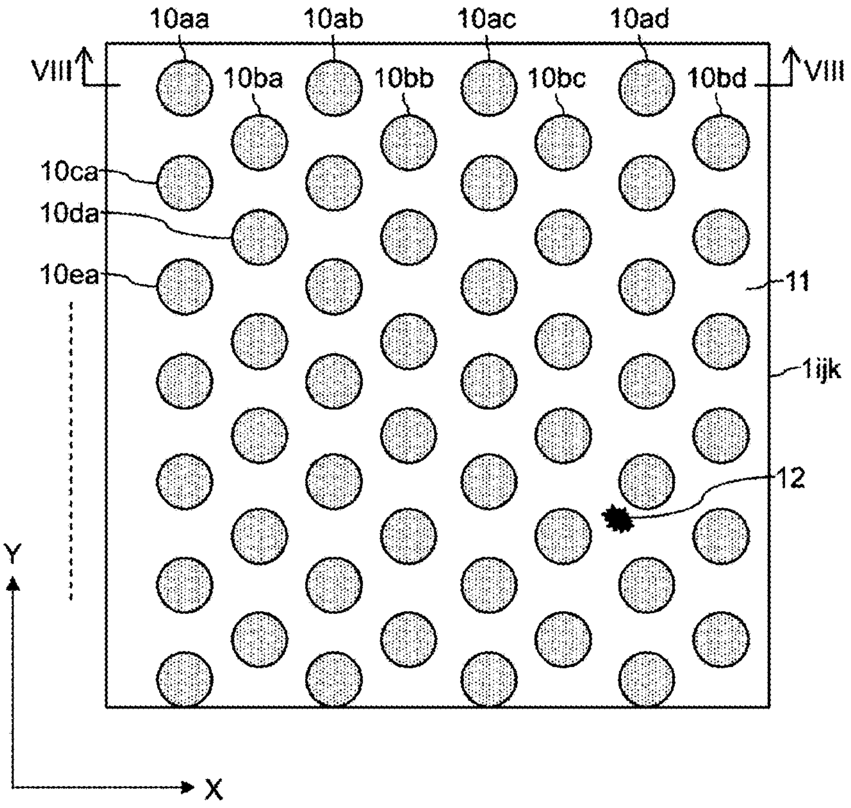
[FIG. 8]
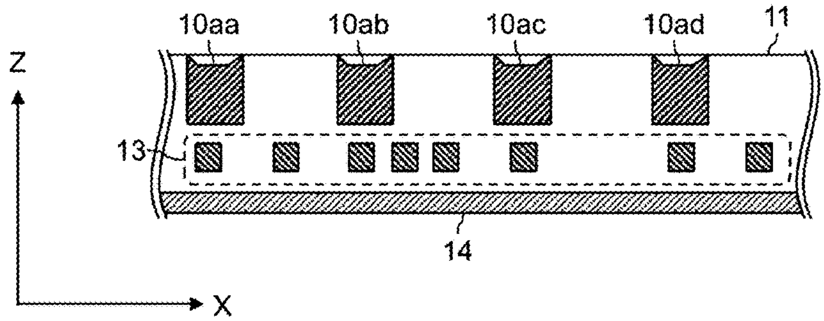
[FIG. 9]
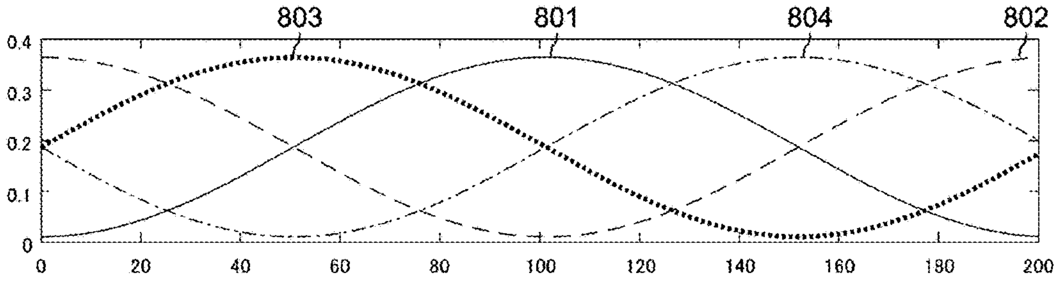

[FIG. 10]
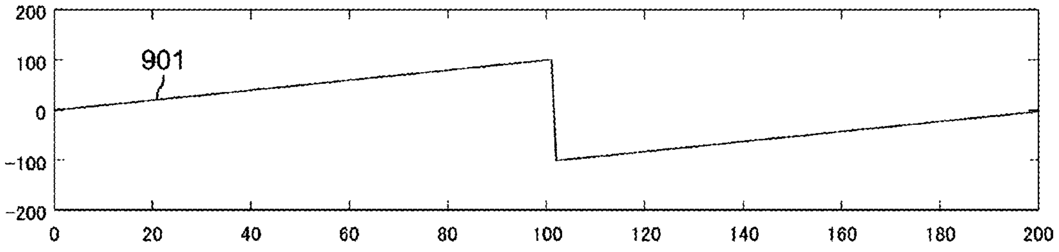
[FIG. 11]
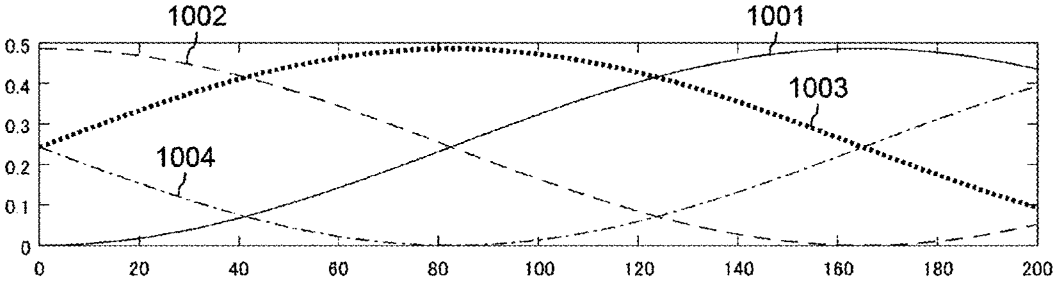
[FIG. 12]
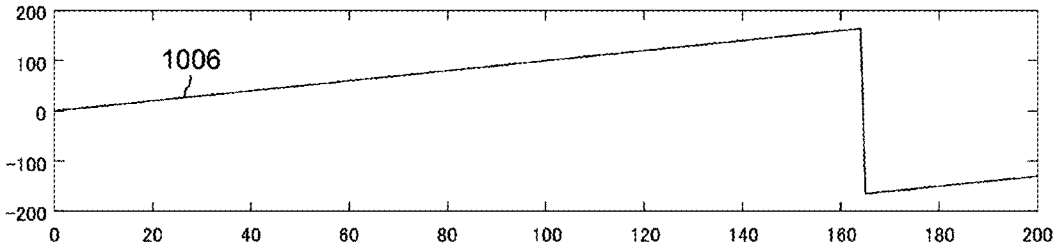
[FIG. 13]
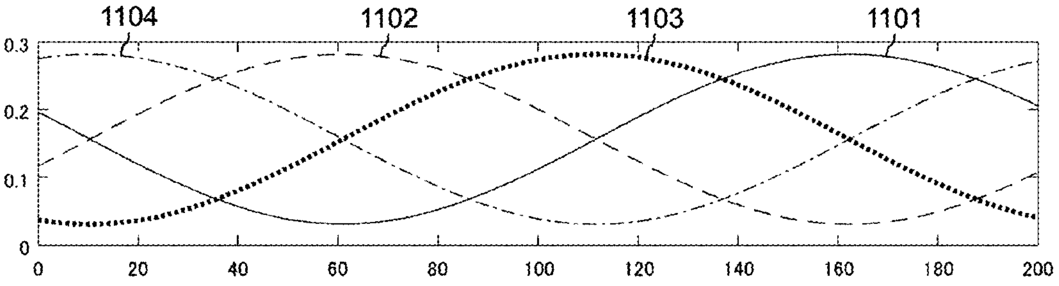
[FIG. 14]
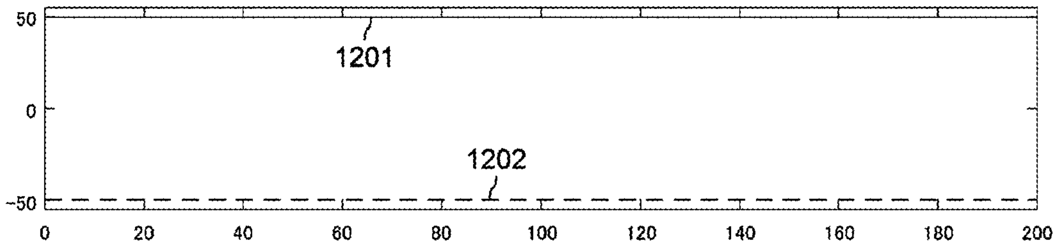

[FIG. 15]
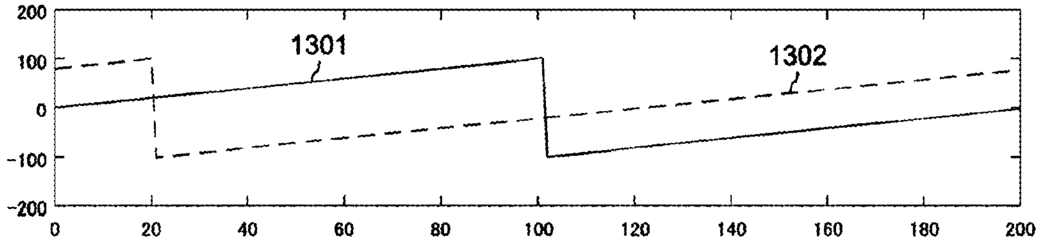
[FIG. 16]
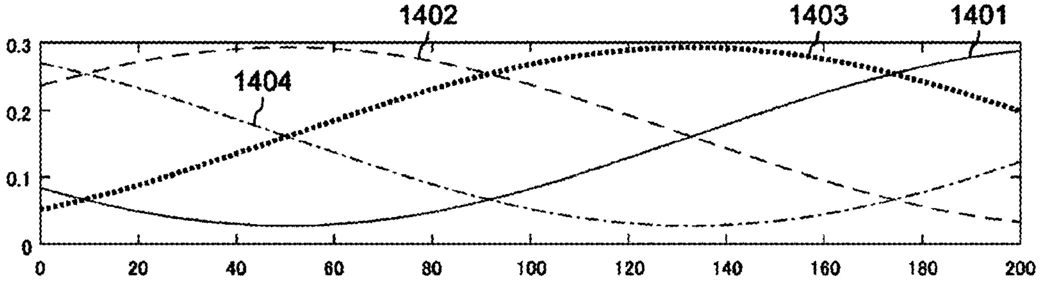
[FIG. 17]
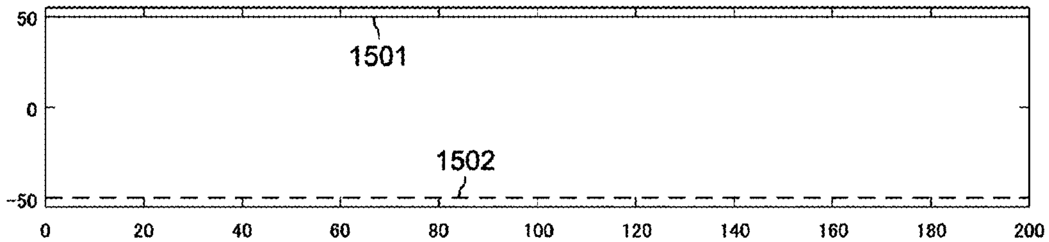
[FIG. 18]
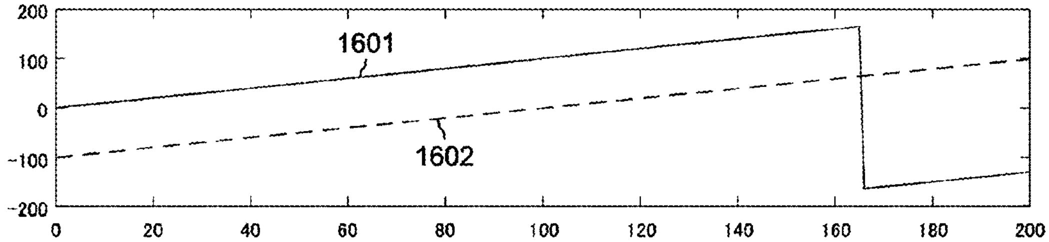
[FIG. 19]
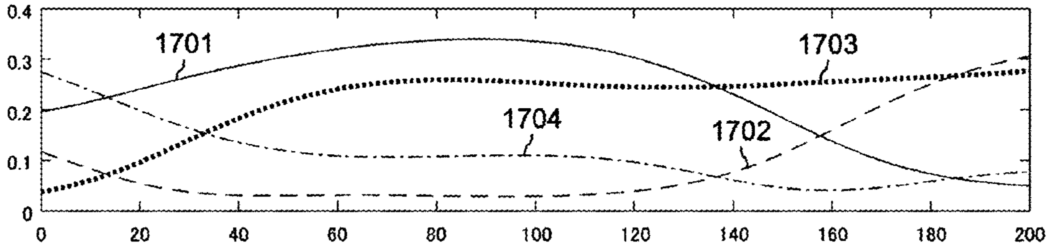

[FIG. 20]
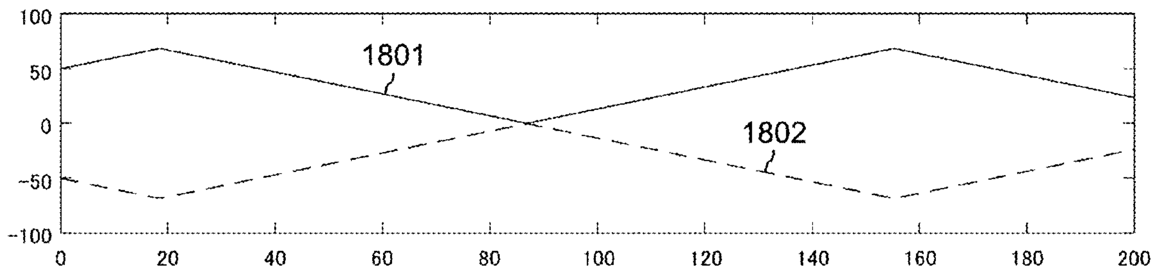
[FIG. 21]
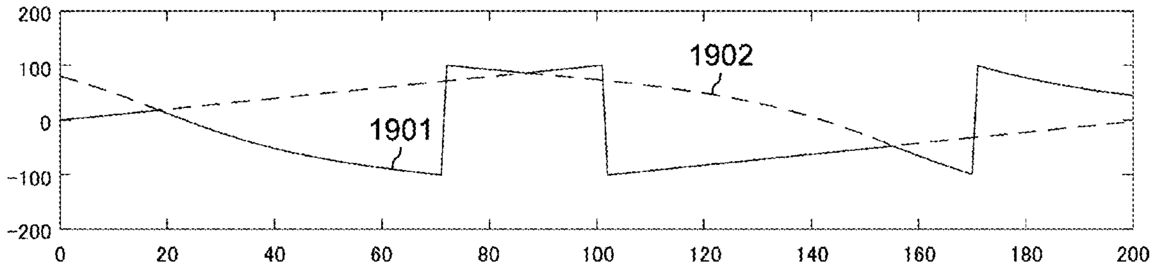
[FIG. 22]
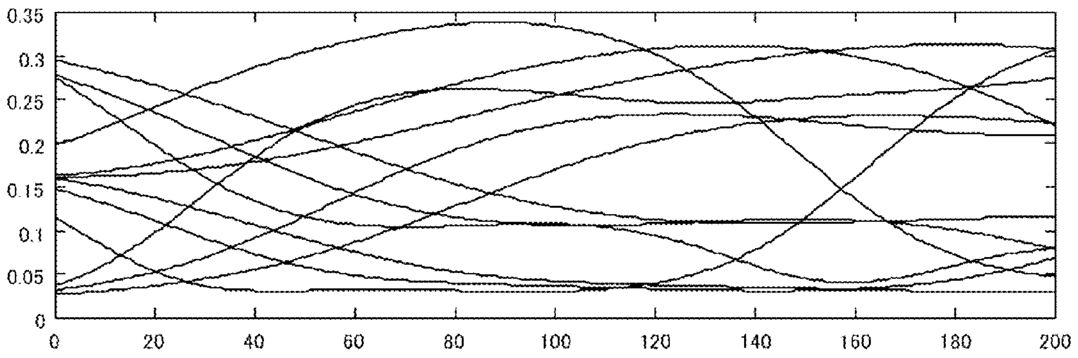
[FIG. 23]
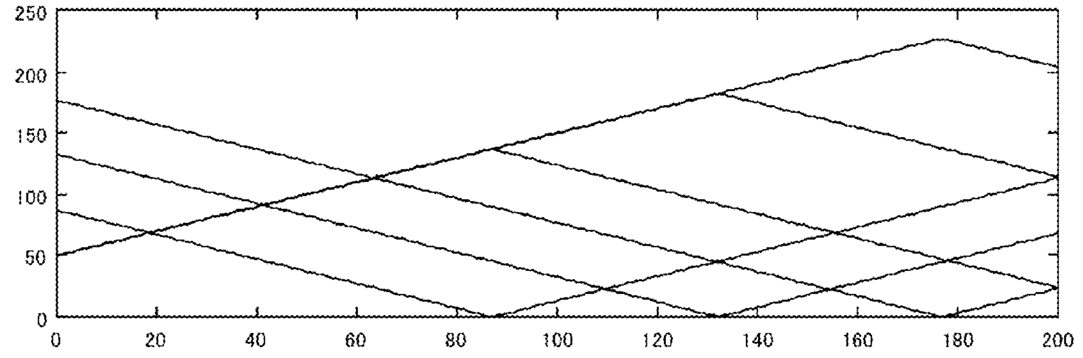

[FIG. 24]
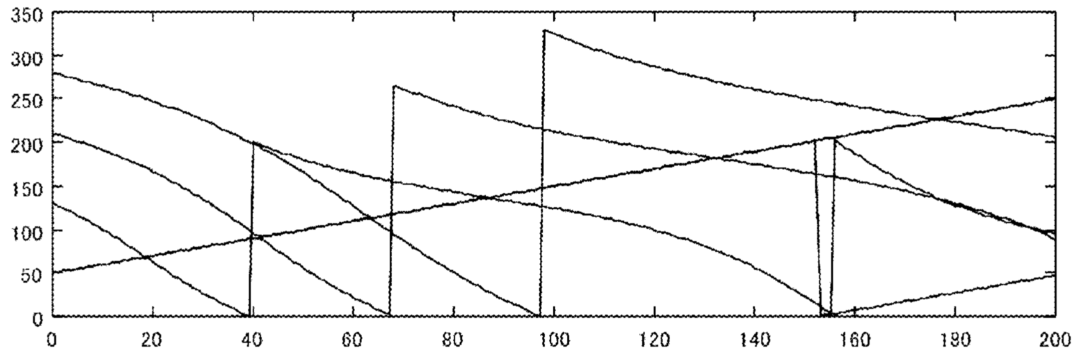

[FIG. 25]
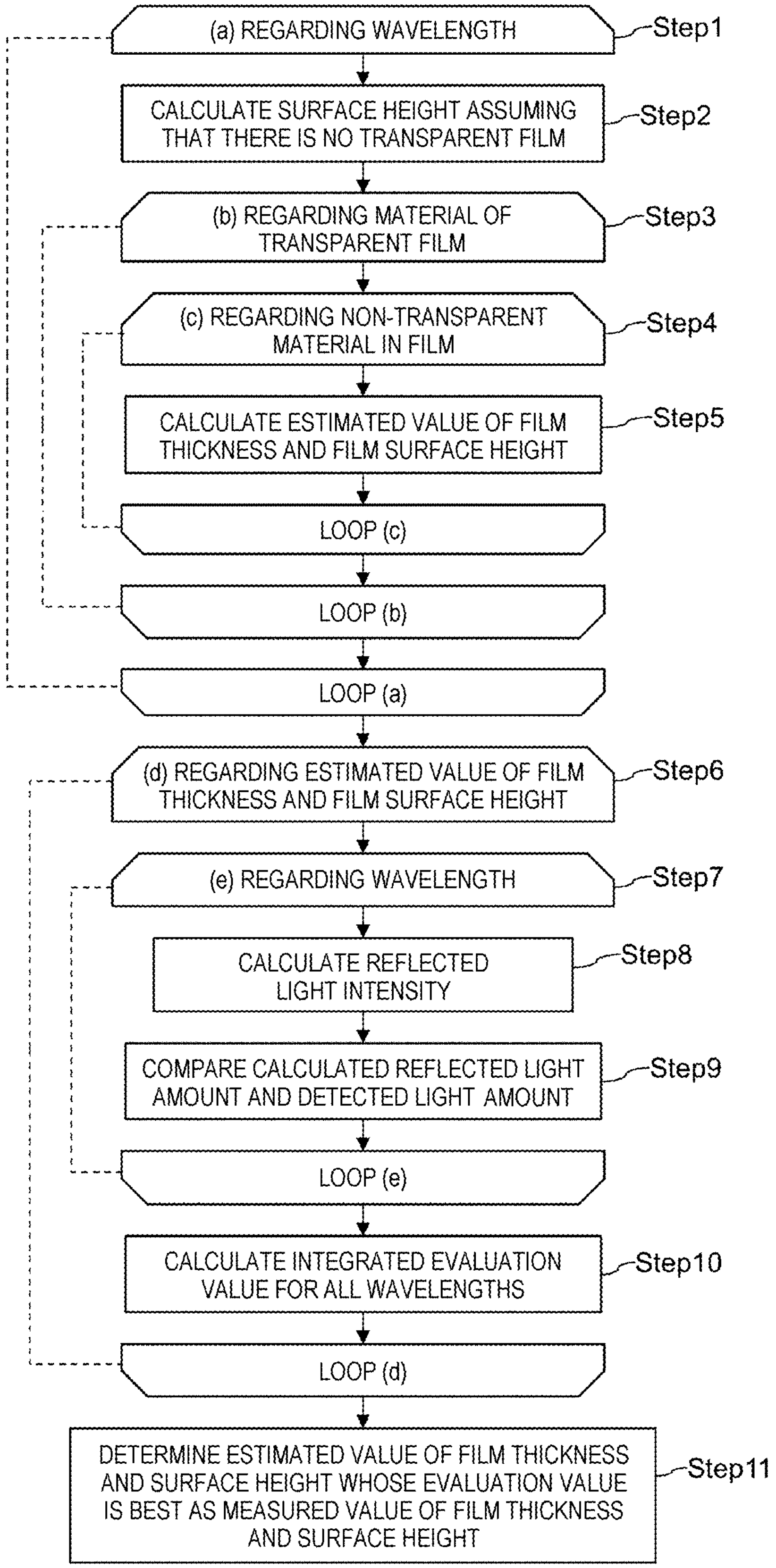

[FIG. 26]
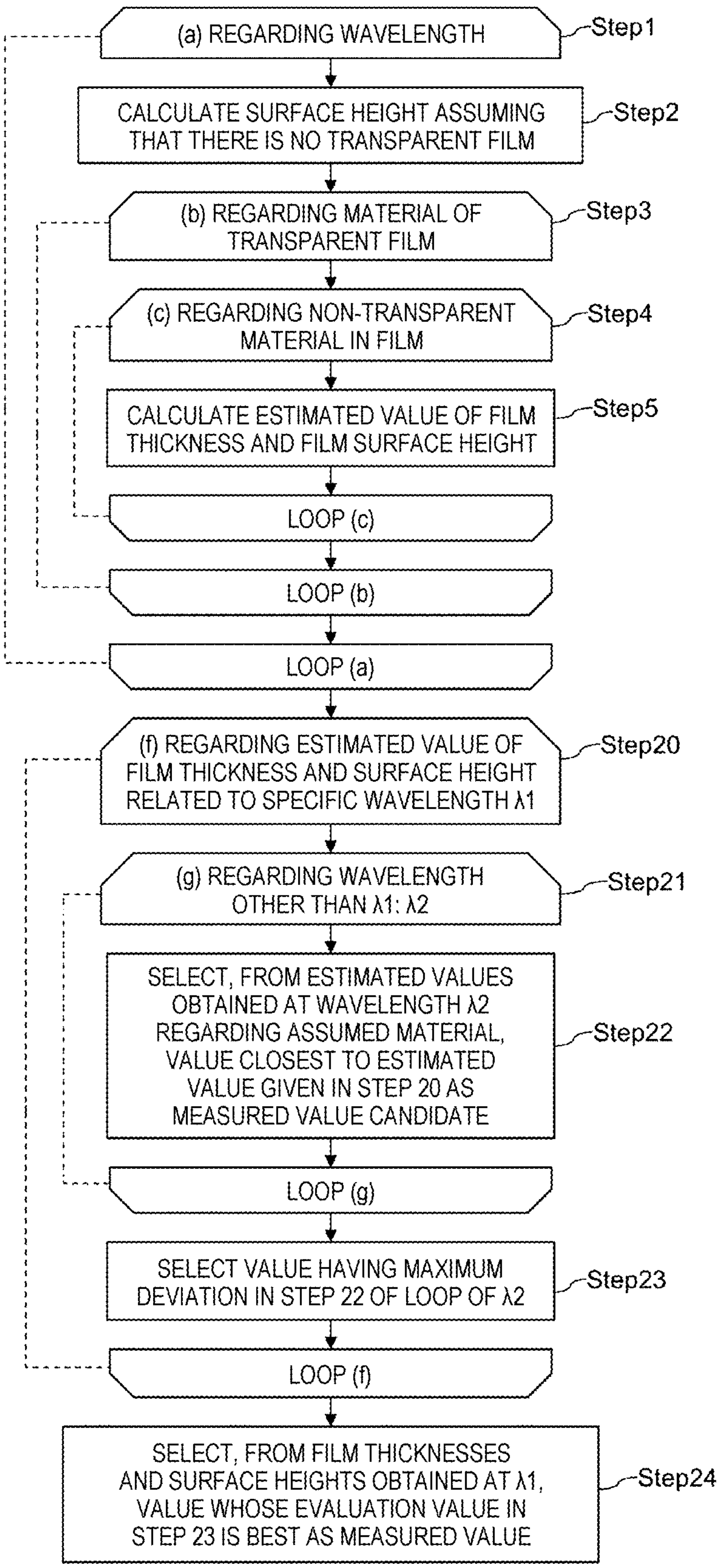

[FIG. 27]
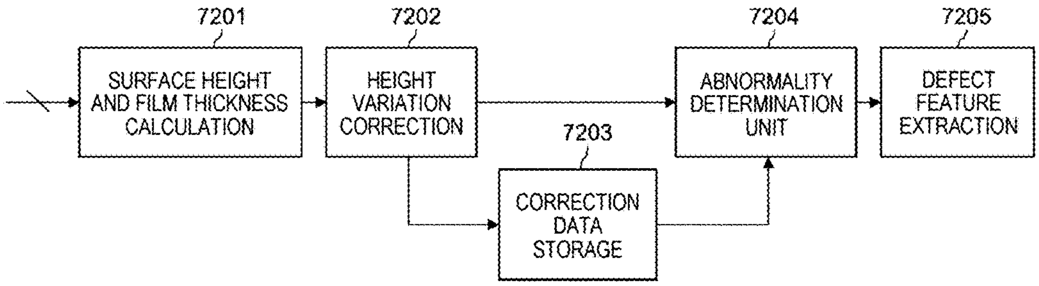
[FIG. 28]
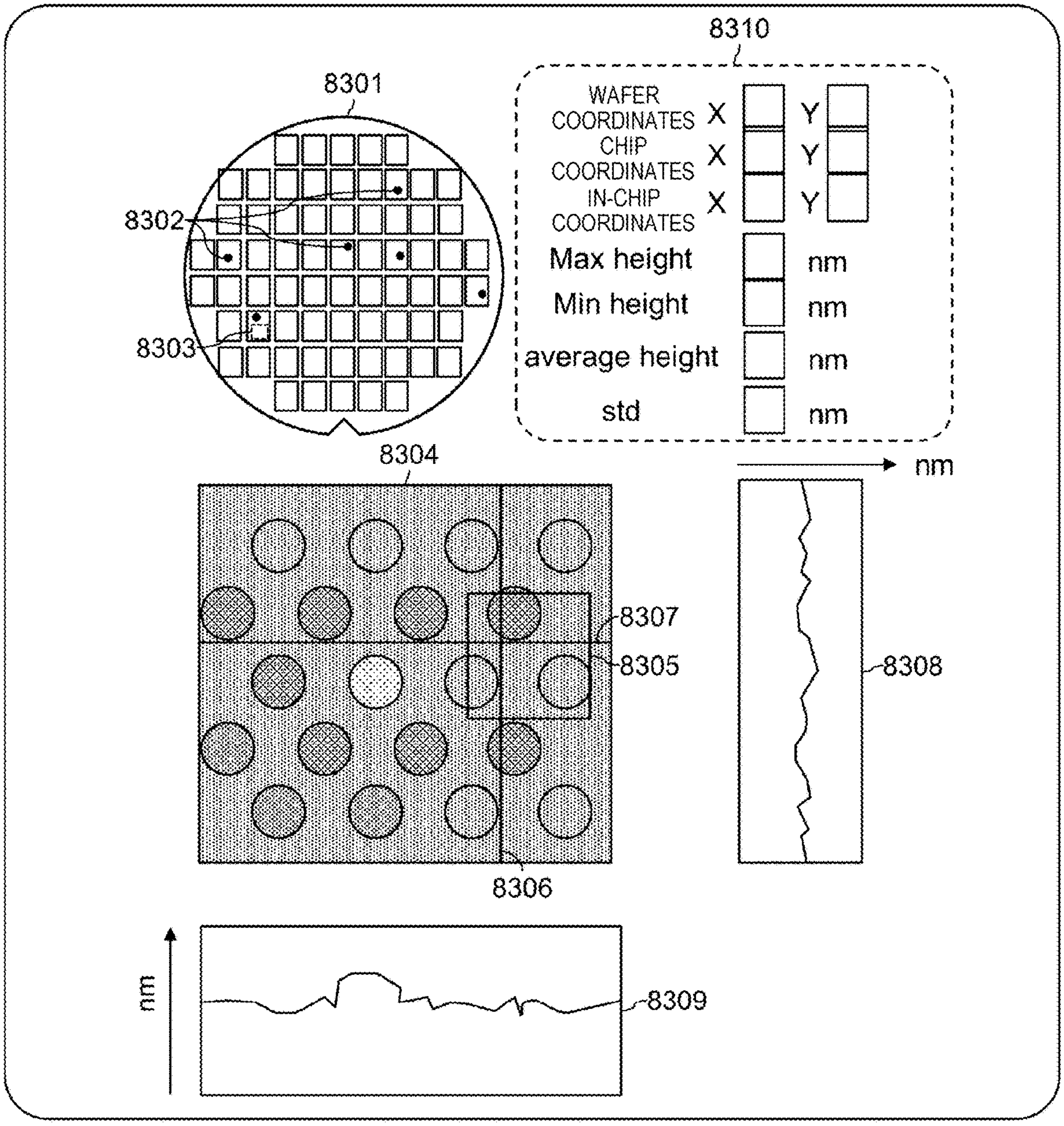

[FIG. 29]
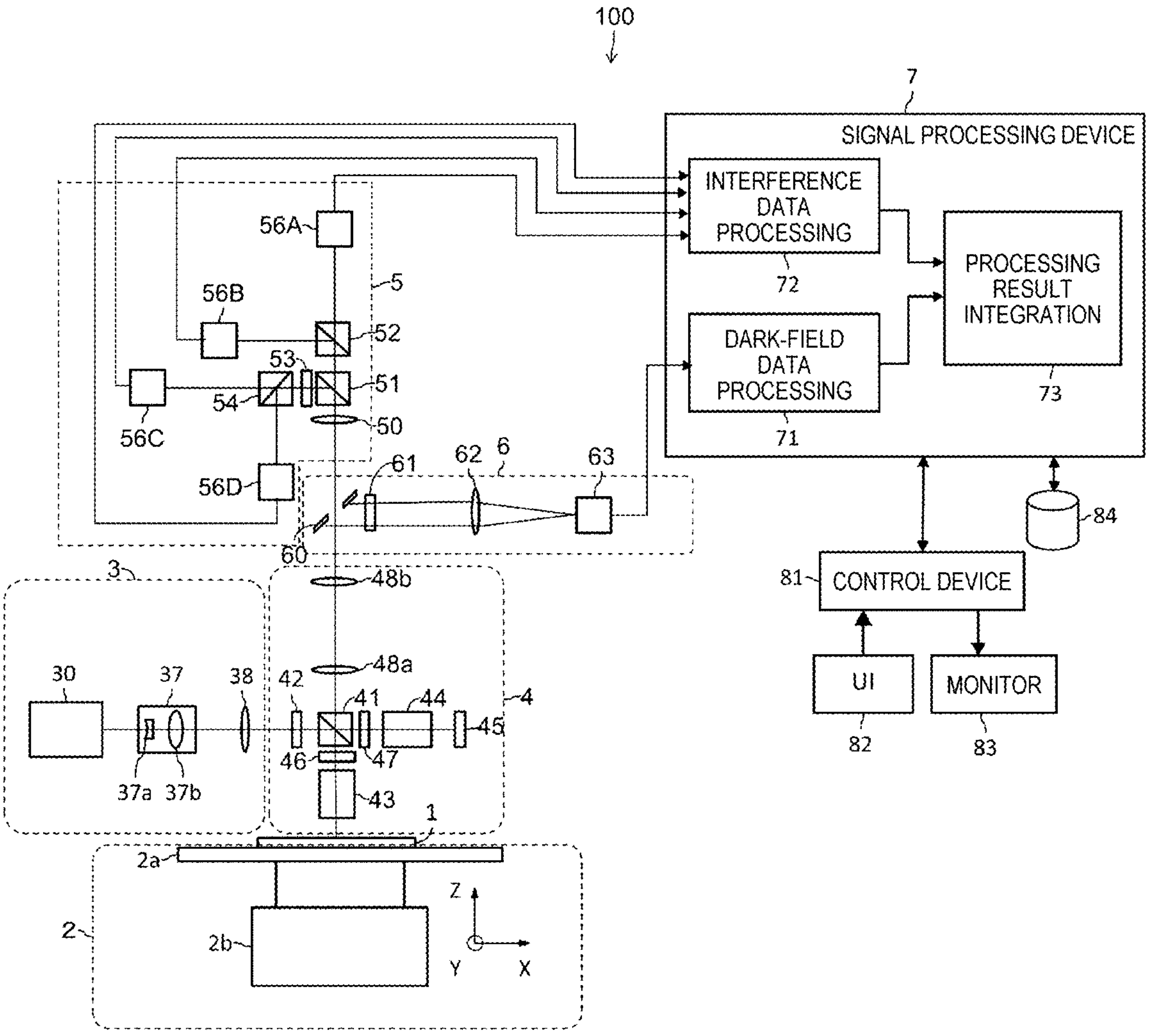
[FIG. 30]
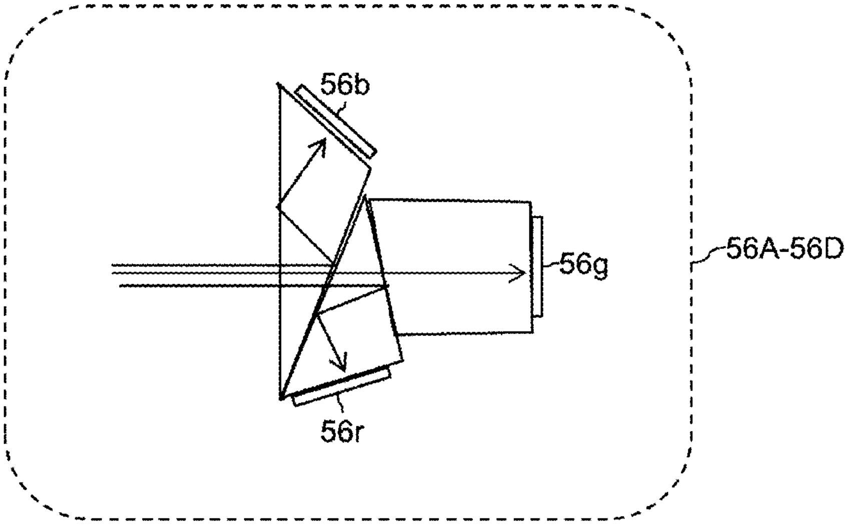

[FIG. 31]
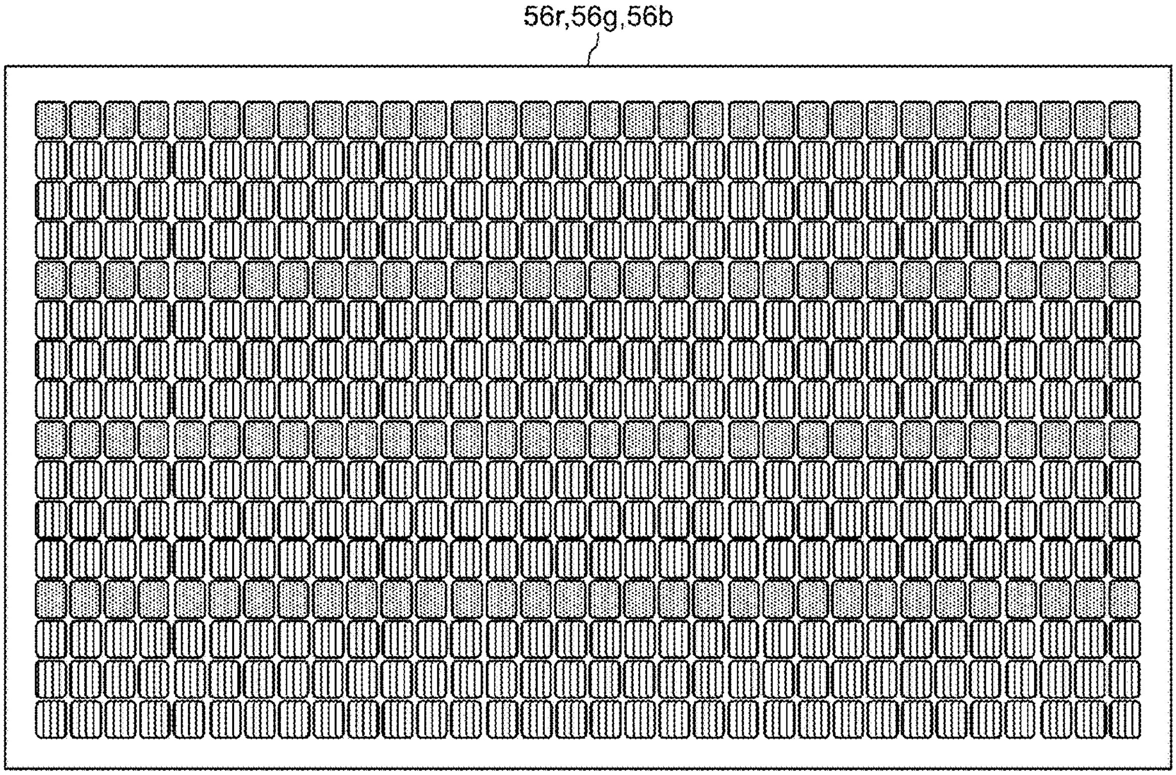

[FIG. 32]
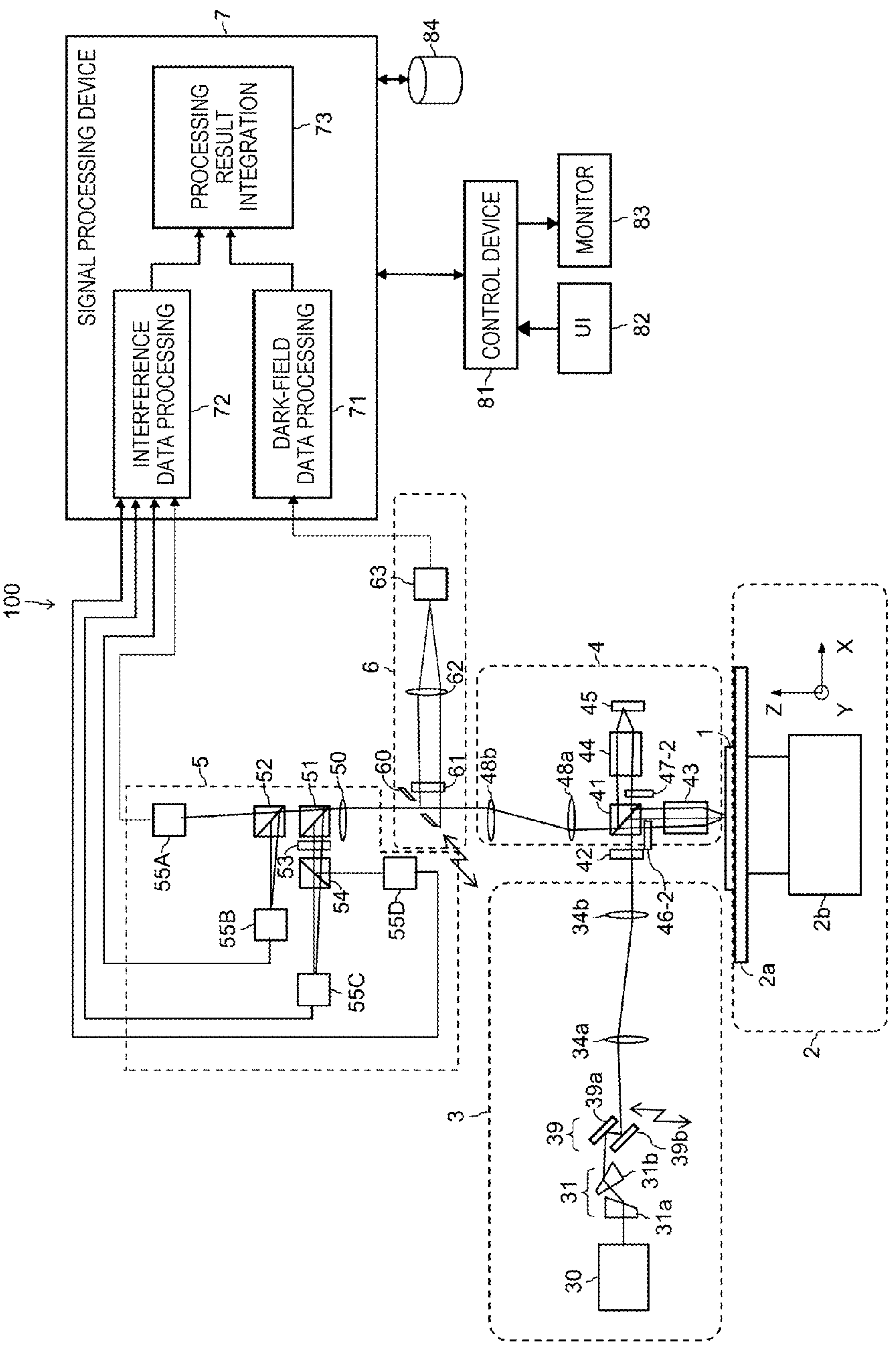

[FIG. 33]
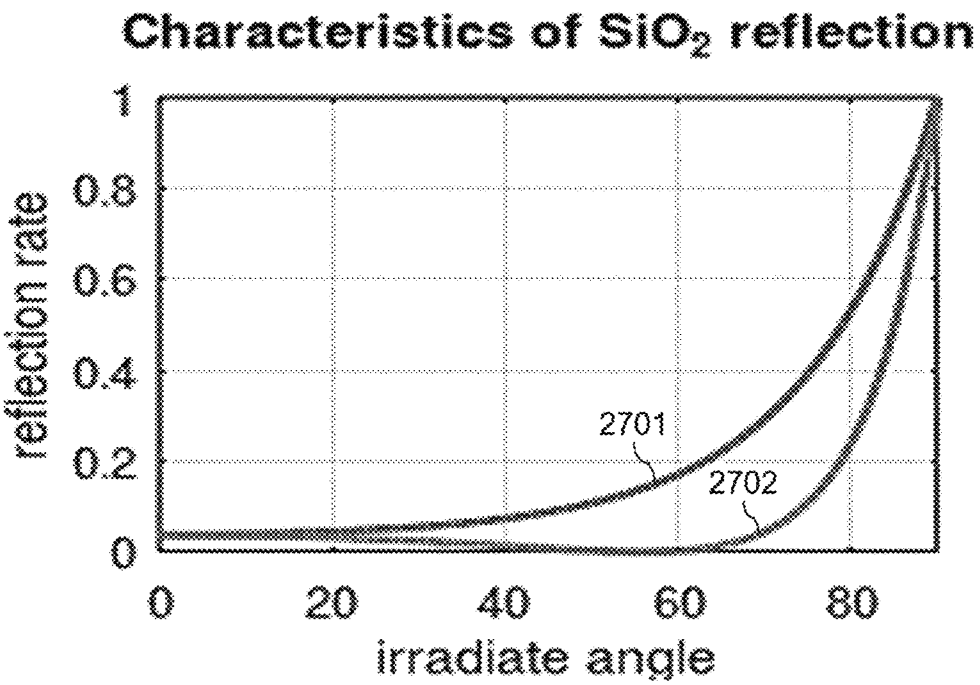
[FIG. 34]
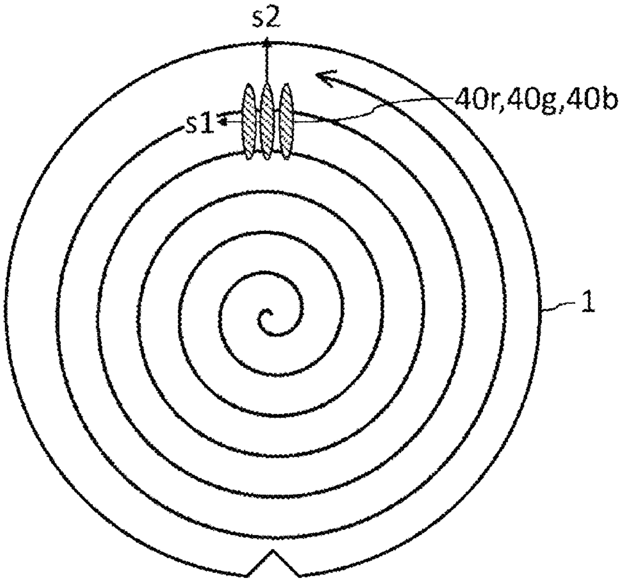

[FIG. 35]
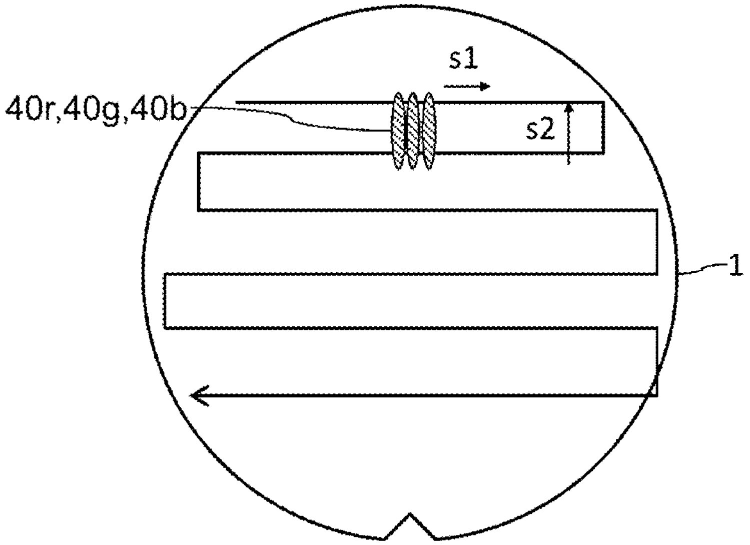
[FIG. 36]
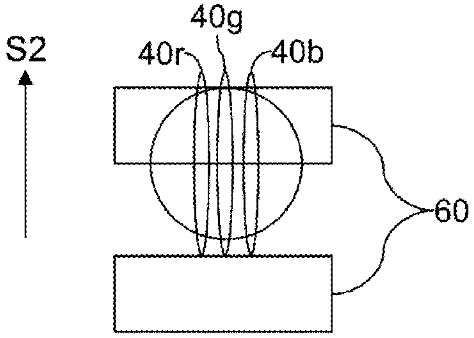

INSPECTION DEVICE

TECHNICAL FIELD

The present invention relates to an inspection device.

BACKGROUND ART

In a manufacturing line of a semiconductor substrate, a thin film substrate, or the like, a surface of the semiconductor substrate, the thin film substrate, or the like is inspected to improve a yield of the product. The surface of the semiconductor substrate or the thin film substrate is required to have smoothness on the nanometer order. For a substrate on which a pattern is not formed when inspection light transmits through the substrate surface, a technique of measuring a step on the substrate surface at high speed by differential interference measurement or the like has been known. However, in the differential interference measurement, when a transparent film is formed on the substrate surface, it is not possible to grasp whether a phase difference occurs on the film or in the film. As an inspection device suitable for a substrate having a transparent film on a surface thereof, an inspection device has been known that irradiates a sample surface with a plurality of light beams having different wavelengths while changing a working distance, and measures reflected light beams before and after the change of the working distance to measure a film thickness and a surface height of the transparent film (see PTL 1 and the like).

CITATION LIST

Patent Literature

PTL 1: JP2014-6242A

SUMMARY OF INVENTION

Technical Problem

As the semiconductor substrate, a wafer having a diameter of 300 mm is typically used, and it is required to inspect the entire surface of the wafer in about one minute. However, in the technique disclosed in PTL in which measurement is performed while changing the working distance, it is necessary to change a distance between an optical system and a sample to perform re-measurement for the same coordinates, and thus it is difficult to inspect the sample at high speed.

In the semiconductor substrate, for example, a circuit pattern using a copper wiring is often present in the transparent film. A refractive index of copper varies depending on the wavelength. When the refractive index is defined as n and an attenuation coefficient is defined as k, (n, k)=(1.15, 2.47) at a wavelength of blue light (470 nm) and (n, k)=(0.35, 3) at a wavelength of red light (600 nm), presenting a large difference. In this case, an intensity ratio of reflected light from the pattern in the transparent film greatly changes between blue light and red light. However, general silicon dioxide as the material of the transparent film has (n, k)≈(1.46, 0) regardless of blue light or red light.

In contrast, in the technique disclosed in PTL 1, as described in paragraph [0048], an AC component of reflected light surface luminance of the transparent film on the surface and an AC component of reflected light surface luminance from the sample to be observed are treated as fixed values independent of the wavelength. When there is no copper wiring in the film, it is generally considered that the reflected light to be measured is reflected light from silicon under the film. Silicon has (n, k)=(4.4, 0.13) under blue light and has (n, k)=(3.95, 0.025) under red light, and the change in refractive index is smaller as compared with that of copper. However, when it is examined to shorten the wavelength of the inspection light to, for example, about 405 nm in order to improve the resolution, the refractive index of silicon greatly changes to (n, k)=(5.42, 0.31). Therefore, even if the object is silicon, it is difficult to regard a ratio of an AC component of the reflection intensity as constant. In the inspection of the semiconductor substrate, although the reflected light from under the film is mainly light reflected by copper or silicon, the structure under the film is often unclear in the inspection stage, and in this respect, it is difficult to widely apply the technique disclosed in PTL 1 to the inspection of an actual electronic product substrate.

Furthermore, since the silicon dioxide forming the transparent film has a high transmittance and the light amount of reflected light generated on the surface is small, a change in the light amount due to a change in the film thickness or the surface height of the transparent film is small, and it is difficult to accurately measure the surface height.

In addition, in the inspection of the semiconductor substrate, it is necessary to inspect not only the film thickness and the surface height of the transparent film but also a foreign object and the like, but it is difficult to inspect a foreign object and the like with the technique disclosed in PTL 1.

An object of the invention is to provide an inspection device capable of measuring a film thickness or a surface height of a transparent film on a substrate surface accurately at high speed in a manufacturing line of a semiconductor substrate, a thin film substrate, or the like.

Solution to Problem

In order to achieve the above object, the invention provides an inspection device for inspecting a sample having a surface formed of a transparent film transmitting light and a non-transparent material, the inspection device including: a light source; a first optical unit configured to irradiate the sample with illumination light emitted from the light source and condense first reflected light reflected by the sample; a second optical unit configured to illuminate a reflecting mirror with the illumination light and condense second reflected light reflected by the reflecting mirror; an interference optical unit configured to cause the first reflected light and the second reflected light to interfere with each other to obtain interference light; a plurality of interference light sensors configured to detect a reflected light intensity of a predetermined polarization component of the interference light; and a signal processing device configured to process a detected light amount of the interference light sensor. The signal processing device identifies, based on the detected light amount of the interference light sensor and refractive indices of the transparent film and the non-transparent material, whether any coordinates of the sample indicate any of the transparent film and the non-transparent material, and measures a surface height or a film thickness of the sample at the coordinates by calculation.

Advantageous Effects of Invention

According to the invention, in a manufacturing line of a semiconductor substrate, a thin film substrate, or the like, a film thickness or a surface height of a transparent film on a substrate surface can be measured accurately at high speed.

BRIEF DESCRIPTION OF DRAWINGS

FIG. 1 is a schematic diagram illustrating a configuration example of an inspection device according to a first embodiment of the invention.

FIG. 2 is a schematic diagram of a semiconductor wafer which is a typical object to be inspected.

FIG. 3 is a diagram illustrating a beam spot by illumination light of a light source provided in the inspection device in FIG. 1.

FIG. 4 is a schematic diagram of an optical scanning unit provided in the inspection device in FIG. 1.

FIG. 5 is a schematic diagram of a light receiving surface of an interference light sensor provided in the inspection device in FIG. 1.

FIG. 6; is a schematic diagram of a spatial filter unit provided in the inspection device in FIG. 1.

FIG. 7 is a schematic diagram illustrating an example of a pattern formed on a sample.

FIG. 8 is a cross-sectional view of the sample taken along a cross-sectional line VIII in FIG. 7.

FIG. 9 is a graph illustrating a relation between a light amount detected by each sensor and a surface height of a pattern when illumination light having a wavelength of 405 nm is incident on the surface of the pattern.

FIG. 10 is a graph illustrating a relation between an estimated value and an actual value of the surface height of the pattern calculated based on the light amount in FIG. 9 obtained by measurement.

FIG. 11 is a graph illustrating a relation between a light amount detected by each sensor and a surface height of a pattern when illumination light having a wavelength of 660 nm is incident on the surface of the pattern.

FIG. 12 is a graph illustrating a relation between an estimated value and an actual value of the surface height of the pattern calculated based on the light amount in FIG. 11 obtained by measurement.

FIG. 13 is a graph illustrating a relation between a light amount detected by each sensor and a surface height of a transparent film having a fixed film thickness when illumination light having a wavelength of 405 nm is incident on a surface of the transparent film.

FIG. 14 is a graph illustrating an estimated value of the film thickness of the transparent film calculated based on the light amount in FIG. 13 obtained by measurement.

FIG. 15 is a graph illustrating an estimated value of the surface height of the transparent film calculated based on the light amount in FIG. 13 obtained by measurement.

FIG. 16 is a graph illustrating a relation between a light amount detected by each sensor and a surface height of a transparent film having a fixed film thickness when illumination light having a wavelength of 660 nm is incident on a surface of the transparent film.

FIG. 17 is a graph illustrating an estimated value of the film thickness of the transparent film calculated based on the light amount in FIG. 16 obtained by measurement.

FIG. 18 is a graph illustrating an estimated value of the surface height of the transparent film calculated based on the light amount in FIG. 16 obtained by measurement.

FIG. 19 is a graph illustrating a relation between a light amount detected by each sensor and a surface height of a transparent film, whose film thickness changes, when illumination light is incident on a surface of the transparent film.

FIG. 20 is a graph illustrating an estimated value of the film thickness of the transparent film calculated based on the light amount in FIG. 19 obtained by measurement.

FIG. 21 is a graph illustrating an estimated value of the surface height of the transparent film calculated based on the light amount in FIG. 19 obtained by measurement.

FIG. 22 is a graph illustrating profiles of all detected light amounts obtained by the respective sensors when a film thickness of a transparent film is changed.

FIG. 23 is a graph illustrating an estimated value of the film thickness of the transparent film calculated based on the light amount in FIG. 22 obtained by measurement.

FIG. 24 is a graph illustrating an estimated value of a surface height of the transparent film calculated based on the light amount in FIG. 22 obtained by measurement.

FIG. 25 is a flowchart illustrating an example of a procedure of calculating a surface height and a film thickness of any measurement portion of a sample by interference data processing in a signal processing device provided in the inspection device in FIG. 1.

FIG. 26 is a flowchart illustrating another example of a procedure of calculating a surface height and a film thickness of any measurement portion of a sample by interference data processing in the signal processing device provided in the inspection device in FIG. 1.

FIG. 27 is a block diagram illustrating an example of a functional block for defect inspection of a sample by the signal processing device provided in the inspection device in FIG. 1.

FIG. 2F is a diagram illustrating an example of an output screen.

FIG. 29 is a schematic diagram illustrating a configuration example of an inspection device according to a second embodiment of the invention.

FIG. 30 is a schematic diagram of an interference light sensor provided in the inspection device according to the second embodiment of the invention.

FIG. 31 is a schematic diagram of a light receiving element array provided in the sensor shown in FIG. 30.

FIG. 32 is a schematic diagram illustrating a configuration example of an inspection device according to a third embodiment of the invention.

FIG. 33 is a graph illustrating reflection characteristics of silicon dioxide.

FIG. 34 is a diagram illustrating a scanning trajectory by a stage provided in the inspection device illustrated in FIG. 32.

FIG. 35 illustrates another example of a scanning trajectory by the stage provided in the inspection device illustrated in FIG. 32.

FIG. 36 is a schematic diagram of a perforated mirror of a dark-field optical unit provided in the inspection device illustrated in FIG. 32.

DESCRIPTION OF EMBODIMENTS

Hereinafter, embodiments of the invention will be described with reference to the drawings.

(Overview)

Inspection devices, to which the invention is applied, in the following embodiments are used for inspecting a surface of a sample (for example, a semiconductor silicon wafer) during a manufacturing process of, for example, a semiconductor. The inspection device according to each embodiment is suitable for measuring a surface height of the sample and a film thickness of a transparent film (including a height of a boundary surface of the transparent film), detecting a minute defect such as a foreign object, and acquiring data on the number, position, dimension, and type of the defect at high speed.

A semiconductor silicon wafer which is a typical example of the sample has a configuration in which a transparent film or a pattern that is a fine structure is formed on a surface of a substrate made of silicon. The material of the transparent film is, for example, silicon dioxide, and has a property of transmitting illumination light used in the inspection device of the invention (property of being transparent to the illumination light). The pattern is made of copper, for example, and has a property of reflecting the illumination light used in the inspection device of the invention (property of not being transparent to the illumination light). The pattern may be provided inside the transparent film or may be exposed on a surface of the transparent film. Thus, a surface of the semiconductor silicon wafer is formed of a transparent film or a non-transparent material (pattern). Silicon, which is the material of the substrate, is also a non-transparent material and reflects the illumination light.

The inspection device of the invention inspects a sample whose surface is formed of a transparent film transmitting illumination light and a non-transparent material reflecting the illumination light, and performs, for example, measurement of a surface height of the sample or a film thickness of the transparent film. Essential components of the inspection device are a light source, a first optical unit, a second optical unit, an interference optical unit, a plurality of interference light sensors, and a signal processing device.

The light source is a unit configured to emit illumination light, and a light source 30 (FIGS. 1, 29, and 32) corresponds to the light source in each embodiment described later.

The first optical unit is a unit configured to irradiate a sample with the illumination light emitted from the light source and condense first reflected light reflected by the sample, and in each embodiment described later, at least an objective lens 43 (FIGS. 1, 29, and 32) corresponds to the first optical unit. Examples of the illumination form for the sample include epi-illumination in which the illumination light is incident on the surface of the sample perpendicularly and oblique illumination in which the illumination light is incident on the surface of the sample obliquely, and the epi-illumination can be performed in any of examples in FIGS. 1, 29, and 32. In the example in FIG. 29, it is also possible to obliquely illuminate the sample with S-polarized illumination light by switching an optical path of the illumination light.

The second optical unit is an optical unit configured to illuminate a reflecting mirror with the illumination light and condense second reflected light reflected by the reflecting mirror. The second optical unit and the reflecting mirror at least correspond to an objective lens 44 and a reflecting mirror 45 (FIGS. 1, 29, and 32) respectively in each embodiment described later.

The interference optical unit is an optical unit configured to obtain interference light by causing the first reflected light and the second reflected light to interfere with each other, and in each embodiment described later, at least a polarized beam splitter 41 (FIGS. 1, 29, and 32) corresponds to the interference optical unit.

The plurality of interference light sensors are sensors configured to detect a reflected light intensity of a predetermined polarization component of the interference light, and at least interference light sensors 55A to 55D (FIGS. 1 and 32) and interference light sensors 56A to 56D (FIG. 29) correspond to the plurality of interference light sensors in each embodiment described later. The interference light sensor detects the reflected light of the illumination light for each polarization component and for each light beam having a different wavelength. In each embodiment, the four interference light sensors 55A to 55D or 56A to 56D detect light beams whose polarization directions are shifted by every 45°.

As a unit for extracting a specific polarization component of the reflected light, a polarized light filter or a polarized beam splitter can be used. In each embodiment described later, a configuration will be described in which reflected light is dispersed according to a polarization component by using a half beam splitter 51 and a polarized beam splitter 52 (FIGS. 1, 29, and 32), and the separated beams of the reflected light are detected by the interference light sensors, respectively. As a configuration in which the reflected light is detected for each wavelength, a configuration in which a plurality of beams of illumination light having different wavelengths are simultaneously emitted and beams of reflected light, thereof are detected or a configuration in which reflected light is dispersed according to the wavelength can be adopted. In a first embodiment (FIG. 1) and a third embodiment (FIG. 32), a configuration will be described in which a light source that emits a plurality of monochromatic light beams having different wavelengths as illumination light is adopted, and reflected light of each wavelength is individually detected on a plurality of light receiving surfaces provided in an interference light sensor. In a second embodiment (FIG. 29), a configuration will be described in which, in each interference light sensor, reflected light is dispersed for each wavelength by a prism and is individually detected on a light receiving surface.

The signal processing device is a computer configured to process a detected light amount of the interference light sensor, and corresponds to a signal processing device 7 (FIGS. 1, 29, and 32) in each embodiment described later. The signal processing device may be implemented by a single computer or may be implemented by a plurality of computers that share functions. The signal processing device identifies whether any coordinates (for convenience, described as coordinates C) of the sample indicate a transparent film or a non-transparent material based on the detected light amount of the interference light sensor and refractive indices of the transparent film and the non-transparent material, and measures a surface height or a film thickness of the sample at the coordinates C by calculation.

The type of the material forming the surface of the sample to be inspected is limited, and the material at the coordinates C is limited to several candidates. For example, if the coordinates C indicate a position where the pattern is exposed, the illumination light is reflected by the surface of the pattern and returns to the first optical unit. In this case, the material is, for example, copper. When the coordinates C indicate a position where the pattern does not exist, the illumination light enters the transparent film, is reflected by the substrate under the film, and returns to the first optical unit. In this case, the material is, for example, silicon dioxide and silicon. When the coordinates C indicate a position where the pattern in the film exists, the illumination light enters the transparent film, is reflected by the pattern in the film, and returns to the first optical unit. In this case, the material is, for example, silicon dioxide and copper. When calculating the surface height of the sample based on the detected light amount, if the sample surface at the coordinates C is a non-transparent material, the surface height is uniquely calculated under the same condition, and if the sample surface at the coordinates C is a transparent film, a plurality of surface heights can be calculated under the same condition (described later).

Therefore, in the inspection device of the invention, the signal processing device calculates one or more estimated values for the surface height of the sample or the film thickness of the transparent film based on the detected light amount for each wavelength at any coordinates C, and collates the one or more estimated values for each wavelength. The signal processing device selects and outputs one of the one or more estimated values calculated for each wavelength as a measured value of the surface height of the sample or the film thickness at the coordinates C by the collation. For example, the signal processing device stores at least one refractive index of the candidate material (silicon dioxide or the like) of the transparent film and at least one refractive index of the candidate material (copper, silicon, or the like) of the non-transparent material. The signal processing device assumes one or two candidate materials for the coordinates C depending on a case where the illumination light incident on the coordinates C is directly reflected by the non-transparent material without passing through the transparent film and a case where the illumination light is reflected by the non-transparent substance via the transparent film. Then, one or two estimated values of the surface height of the sample or the film thickness are calculated for each wavelength based on the refractive index of the assumed candidate material and the detected light amount for each wavelength obtained by each interference light sensor. The estimated values calculated for each wavelength are subjected to collation processing, and the one or one of the two estimated values calculated for each wavelength is selected and determined as the measured value of the surface height of the sample or the film thickness and output. The signal processing device can identify, as the material at the coordinates C, the candidate material related to the estimated value adopted for the measured value in accordance with the determination of the measured value in this manner.

As the collation processing performed by the signal processing device, cross-validation utilizing the detected light amount obtained for each wavelength can be adopted. For example, a light amount of another wavelength to be detected is calculated in order that the estimated value calculated based on the detected light amount for each wavelength is calculated to be equal to an estimated value calculated for the other wavelength for the same candidate material, and the calculated value of the light amount of the other wavelength is compared with the detected light amount. In this case, the estimated value having the smallest deviation from the calculated value obtained for the other wavelengths can be determined as the measured value. For example, when a surface height h is calculated based on a detected light amount I1 of the illumination light having a wavelength λ1 under an assumed condition that a pattern exists in the film at the coordinates C, a light amount of a wavelength λ2 to be detected is calculated in order that the surface height h is calculated for the illumination light of the wavelength λ2 under the same assumed condition. When a difference between the calculated value of the light amount of λ2 and the detected light amount of λ1 is minimum or 0 (or equal to or less than an allowable value set in advance for determination of identity), the estimated value is regarded as the measured value for the coordinates C. At the same time, the candidate material in the assumed condition related to the estimated value can be identified as the actual material at the coordinates C. This specific example will be described later with reference to FIG. 25.

The collation processing performed by the signal processing device is not limited to the above example. In another example, it is possible to adopt a method of comparing estimated values calculated based on different wavelengths for the same candidate material, identifying, as the material at the coordinates C, a candidate material for which the estimated values of all the wavelengths coincide with each other or have a difference equal to or less than the allowable value, and determining the estimated value related to the material as the measured value. This specific example will be described later with reference to FIG. 2E.

The signal processing device can also perform defect inspection of the sample based on the measured value of the surface height. For example, the signal processing device measures the surface height of the sample for each predetermined region, determines whether the measurement result falls within a predetermined range, and outputs, as a defect, a region for which the measurement result is out of the predetermined range. This specific example will be described later with reference to FIG. 27.

In addition, the inspection device according to each embodiment includes an optical path branch unit, a spatial filter, and a dark-field light sensor, and can extract dark-field light (scattered light from the sample) from the interference light used for measuring the surface height of the sample and simultaneously perform the defect inspection on a foreign object or the like on the surface of the sample. Specifically, the dark-field light is separated by the optical path branch unit from reflected light condensed by the first optical unit and the second optical unit. The dark-field light separated by the optical path branch unit has its diffracted light removed by the spatial filter, and the dark-field light transmitted through the spatial filter is detected by the dark-field light sensor. The signal processing device detects a defect of the sample based on an output of the dark-field light sensor. In each embodiment described later, a perforated mirror 60, a spatial filter unit 61, and a dark-field light sensor 63 (FIGS. 1, 29, 32, and 36) correspond to the optical path branch unit, the spatial filter, and the dark-field light sensor, respectively.

Some specific embodiments of the inspection device whose outline is described above will be described below.

First Embodiment

1. Inspection Device

FIG. 1 is a schematic diagram illustrating a configuration example of an inspection device 100 according to a first embodiment of the invention. The inspection device 100 illustrated in FIG. 1 is an inspection device that takes a sample 1 as an object to be inspected, measures a height of a surface of the sample 1, and simultaneously inspects a defect such as a minute foreign object and a minute depression on the surface of the sample 1. When a transparent film is present on the surface of the sample 1, a film thickness of the transparent film and a boundary surface height can also be measured. As the sample 1, a circular plate-shaped semiconductor silicon wafer having a flat surface on which a pattern is formed is assumed as a representative example.

The inspection device 100 includes a stage 2, an illumination optical unit 3, an illumination and detection optical unit 4, an interference optical unit 5, a dark-field optical unit 6, the signal processing device 7, a control device 81, a user interface 82, a monitor 83, and a memory device 84. The memory device 84 stores a processing parameter to be applied when the signal processing device processes a detection signal to be processed, and a result of the processing performed by the signal processing device.

2. Stage 2

The stage 2 includes a sample stage 2*a* and a sample driving stage 2*b*. The sample stage 2*a* is a stage configured to support the sample 1. The sample driving stage 2*b* is a device configured to drive the sample stage 2*a* to change a relative position between the sample 1 and the illumination and detection optical unit 4, and includes an XY stage and a Z stage although not shown in detail. The sample stage 2*a* is supported on the XY stage via the Z stage. The Z stage functions to adjust the height of the surface of the sample 1. The XY stage is driven according to a control signal of the control device 81 so that a desired inspection region of the sample 1 enters the field of view of the illumination and detection optical unit 4. When detection performed by the interference optical unit 5 and the dark-field optical unit 6 is completed for one inspection region, the control device 81 controls the sample driving stage 2*b* so that the next inspection region enters the field of view of the illumination and detection optical unit 4. The sample driving stage 2*b* performs a step-and-repeat operation. That is, the sample driving stage 2*b* repeats an operation of moving a desired inspection point of the sample 1 to an illumination position that is irradiated with illumination light by the illumination and detection optical unit 4 and temporarily stopping, and moving the next inspection point to the illumination position after image data of the inspection point is completed.

FIG. 2 is a schematic diagram of a semiconductor wafer that is a typical object to be inspected. A plurality of chips are formed in a matrix on the surface of the sample 1 that is a semiconductor wafer. In the drawing, a situation is shown in which a visual field 1*ijk* is positioned in a chip 1*ij* among the plurality of chips formed on the surface of the sample 1 in the process in which the sample 1 moves with respect to the visual field 1*ijk* of the illumination and detection optical unit 4 by the operation of the sample driving stage 2*b* during the inspection of the sample 1. In the inspection device 100 according to the embodiment, any inspection region on the surface of the sample 1 is placed in the visual field 1*ijk* of the illumination and detection optical unit 4 to acquire image data thereof, and when the image data of the inspection region is acquired, the sample 1 is moved to acquire image data of the next inspection region. In the way, the sample 1 is scanned by the step-and-repeat method.

3. Illumination Optical Unit 3

The illumination optical unit 3 illustrated in FIG. 1 includes an optical element group, and irradiates desired illumination light to the sample 1 placed on the sample stage 2*a*. The illumination optical unit 3 includes the light source 30, an illumination shaping unit 31, a half beam splitter 32, an optical scanning unit 33, relay lenses 34*a* and 34*b*, and relay lenses 35*a* and 35*b*.

3-1. Light Source 30

The light source 30 is a unit configured to emit a laser beam as illumination light, and in the embodiment, a multiline laser light source that emits a plurality of monochromatic light beams is adopted. The light source 30 in the embodiment simultaneously emits blue light (wavelength 405 nm), green light (532 nm), and red light (660 nm), which have a longer coherence length, side by side in ascending order of wavelength. FIG. 3 is a diagram illustrating beam spots of illumination light emitted from the light source 30. Shapes of beam spots 40*r*, 40*g*, and 40*b* of the illumination light of the light source 30 have, for example, a Gaussian profile with a minor axis of several tens to several hundreds of micrometers and a major axis of several millimeters to several tens of millimeters. The beam spot 40*r* is red light (wavelength 660 nm), the beam spot 40*g* is green light (wavelength 532n), the beam spot 40*b* is blue light (wavelength 405 nm), and in the field 1*ijk* of the illumination and detection optical unit 4, the beam sports are formed side by side in a minor axis direction and close to each other.

3-2. Illumination Shaping Unit 31

The illumination shaping unit 31 includes anamorphic prisms 31*a* and 31*b*. The illumination light beams of the three colors from the light source 30 are enlarged in specific directions, respectively, by the anamorphic prisms 31*a* and 31*b*. The light beam shaped by the illumination shaping unit 31 has an elliptical shape (FIG. 3) having a large aspect ratio between a minor axis and a major axis in a cross section orthogonal to an optical axis thereof.

3-3. Half Beam Splitter 32

The half beam splitter 32 guides the light shaped by the illumination shaping unit 31 to the optical scanning unit 33, and guides light, which is condensed by the illumination and detection optical unit and guided via the optical scanning unit 33, to the relay lenses 35*a* and 35*b*.

3-4. Optical Scanning Unit 33

FIG. 4 is a schematic diagram of the optical scanning unit 33. The optical scanning unit 33 is typically a MEMS optical scanner, and an electrostatic type optical scanning unit is exemplified here. The optical scanning unit 33 includes a reflecting surface 33*a* and drive electrodes 33*b* and 33*c*. The reflecting surface 33*a* is supported by a rotation shaft 33*d* and tilts about the rotation shaft 33*d*. By applying a voltage to the drive electrodes 33*b* and 33*c*, an angle of the reflecting surface 33*a* changes around the rotation shaft 33*d*, and a reflection direction of the light guided from the half beam splitter 32 is changed for scanning. In the embodiment, a MEMS mirror of an electrostatic type is used for the reflecting surface 33*a*, and an electromagnetic type may be adopted instead of the electrostatic type, or a galvanometer mirror may be adopted instead of the MEMS mirror.

3-5. Relay Lenses 34*a* and 34*b*

The relay lenses 34*a* and 34*b* relay the light guided from the reflecting surface 33*a* of the optical scanning unit 33 to the illumination and detection optical unit 4, and form images of the light on pupil planes of the objective lenses 43 and 44 (described later) of the illumination and detection optical unit 4. That is, the relay lenses 34*a* and 34*b* are adjusted so that the reflecting surface 33*a* is at a position conjugate to the pupil surfaces of the objective lenses 43 and 44. Accordingly, the visual field 1*ijk* can be scanned with the beam spots 40*r*, 40*g*, and 40*b* by changing the angle of the reflecting surface 33*a*. The light condensed by the illumination and detection optical unit 4 is relayed by the relay lenses 34*a* and 34*b* and returns to the reflecting surface 33*a* of the optical scanning unit 33.

3-6. Relay Lenses 35*a* and 35*b*

The relay lenses 35*a* and 35*b* relay the light, which is condensed by the illumination and detection optical unit 4 and guided via the optical scanning unit 33 and the half beam splitter 32, to the interference optical unit 5 and the dark-field optical unit 6.

4. Illumination and Detection Optical Unit 4

The illumination and detection optical unit 4 includes a quarter-wavelength plate 42, the polarized beam splitter 41, the objective lenses 43 and 44, and the reflecting mirror 45.

The light guided from the illumination optical unit 3 via the relay lenses 34*a* and 34*b* is converted from linearly polarized light to circularly polarized light by the quarter-wavelength plate 42 whose fast axis or slow axis is rotated by 45°. The circularly polarized light is split into two light beams by the polarized beam splitter 41 according to a difference in polarization direction, and the split light beams are incident on the objective lenses 43 and 44, respectively.

The light incident on the objective lens 43 forms a beam spot (beam spots 40*r*, 40*g*, and 40*b*) on the surface of the sample 1. Reflected light generated at the beam spot is condensed by the objective lens 43 and returns to the polarized beam splitter 41.

On the other hand, the light incident on the objective lens 44 forms a beam spot on a surface of the reflecting mirror 45. Reflected light generated at the beam spot is condensed by the objective lens 44 and returns to the polarized beam splitter 41.

The reflected light, which is reflected by the sample 1 and the reflecting mirror 45 and returned to the polarized beam splitter 41, has its polarization direction converted by the quarter-wavelength plate 42, and returns to the optical scanning unit 33 via the relay lenses 34*a* and 34*b*. The light returned to the optical scanning unit 33 is reflected by the reflecting surface 33*a* and relayed to the interference optical unit 5 and the dark-field optical unit 6 via the relay lenses 34*a* and 34*b*.

5. Interference Optical Unit 5

The interference optical unit 5 is a unit configured to perform interference measurement on light condensed by the illumination and detection optical unit 4. The interference optical unit 5 includes an imaging lens 50, the half beam splitter 51, the polarized beam splitter 52, a quarter-wavelength plate 53, a polarized beam splitter 54, and interference light sensors 55A, 553, 55C, and 55D.

The light reflected by the sample 1 and the reflecting mirror 45 and transmitted via the relay lenses 35*a* and 35*b* enters the half beam splitter 51 via the imaging lens 50 and is split into two light beams.

One light beam split by the half beam splitter 51 is guided to the polarized beam splitter 52 and further split into two light beams according to the polarization direction. The two light beams split by the polarized beam splitter 52 form interference images of the beam spots formed on the sample and the reflecting mirror 45, on light receiving surfaces of the interference light sensors 55A and 55B, respectively.

The other light beam split by the half beam splitter 51 is changed in the polarization direction by the quarter-wavelength plate 53 whose fast axis or slow axis is rotated by 45°, guided to the polarized beam splitter 54, and further split into two light beams according to the polarization direction. The two light beams split by the polarized beam splitter 54 form interference images of the beam spots formed on the sample 1 and the reflecting mirror 45, on light receiving surfaces of the interference light sensors 55C and 55D, respectively.

FIG. 5 is a schematic diagram of the light receiving surfaces of the interference light sensors 55A to 55D. Each of the interference light sensors 55A to 55D includes three light receiving surfaces 55*r*, 55*g*, and 55*b*. Reflected light from the beam spots 40*r*, 40*g*, and 40*b* is incident on the light receiving surfaces 55*r*, 55*g*, and 55*b*, respectively, and images of the beam spots 40*r*, 40*g*, and 40*b* are formed. The surface of the sample 1 or the reflecting mirror 45 is scanned with the beam spots 40*r*, 40*g*, and 40*b* according to the angle change of the reflecting surface 33*a*, and the reflected light is reflected by the same reflecting surface 33*a* and guided to the interference optical unit 5 as described above. Therefore, even when the beam spots 40*r*, 40*g*, and 40*b* are used for scanning, images of the beam spots 40*r*, 40*g*, and 40*b* are always formed on the corresponding light receiving surfaces 55*r*, 55*g*, and 55*b*.

Each of the light receiving surfaces 55*r*, 55*g*, and 55*b* operates as an individual TDI sensor, and synchronizes beam spot scanning associated with the reflecting surface 33*a* with its own output. Each of the light receiving surfaces 55*r*, 55*g*, and 55*b* has a configuration in which line sensors (light receiving element groups) arranged in a one-dimensional array are arranged in an S1 direction in FIG. 5 by n lines. Every time the beam spots 40*r*, 40*g*, and 40*b* formed on the sample 1 move on the sample surface by a distance corresponding to a size of one pixel of the interference light sensors 55A to 55D, the interference light sensors 55A to 55D sequentially output signals corresponding to one line of the light receiving surfaces 55*r*, 55*g*, and 55*b*. For example, it is assumed that the light amount received by a line sensor in the i-th column of the light receiving surface 55*r* at a specific time-point t is SR (i, t), and an interval at which one line performs output is ΔT. When the beam spot 40*r* moves in the direction S1 in FIG. 5, a signal SRO (t) output by the interference light sensors 55A to 55D at the specific time-point t is calculated by the following formula.

$$SRO(t) = \sum_i SR(i, t-(i+1)\Delta T) \quad \text{[Formula 1]}$$

6. Dark-Field Optical Unit 6

The dark-field optical unit 6 is a unit configured to perform dark-field detection, and includes the perforated mirror 60, the spatial filter unit 61, an imaging lens 62, and the dark-field light sensor 63.

The perforated mirror 60 relates to the relay lenses 34*a*, 34*b*, 35*a*, and 35*b*, and is conjugate with pupils of the objective lenses 43 and 44. The perforated mirror 60 does not interfere with optical axes of the relay lenses 34*a* and 34*b*, and reflects light deviated from the optical axes by a predetermined distance or more. Since the reflected light from the smooth reflecting mirror 45 travels uniformly along the optical axis, the entire reflected light transmits through the perforated mirror 60 and is guided to the interference optical unit 5. On the other hand, the light condensed by the objective lens 43 includes scattered light generated at the foreign object in addition to direct reflected light from the sample 1. The direct reflected light traveling along the optical axis transmits through the perforated mirror 60 together with the reflected light from the reflecting mirror 45, and travels to the interference optical unit 5. On the other hand, the scattered light traveling off the optical axis is reflected by the perforated mirror 60 and guided to the spatial filter unit 61. All light guided to the spatial filter unit 61 is the scattered light generated at the sample 1. The spatial filter unit 61 is close to the perforated mirror 60, and is provided at a position conjugate with the pupils of the objective lenses 43 and 44 similarly to the perforated mirror 60. The light passing through the spatial filter unit 61 forms an image on a light receiving surface of the dark-field light sensor 63 by the imaging lens 62. The dark-field light sensor 63 detects an image of the foreign object on the surface of the sample 1 based on, for example, light (405 nm) having the shortest wavelength.

6-1. Spatial Filter Unit 61

FIG. 6 is a schematic diagram of the spatial filter unit 61. The spatial filter unit 61 includes rods 61*a* to 61*j* that are translated by a motor. The rods 61*a* to 61*e* extend in a longitudinal direction in the drawing and are arranged in parallel to a transverse direction, and the rods 61*f* to 61*j* extend in the transverse direction in the drawing and are arranged in parallel to the longitudinal direction. The rods 61$a$ to 61$e$ overlap with the rods 61$f$ to 61$j$, and the rods 61$a$ to 61$j$ are formed in a mesh shape. The spatial filter unit 61 removes diffracted light, which comes from the pattern periodically formed on the surface of the sample 1, by the rods 61$a$ to 61$j$ formed in a mesh shape, and transmits the scattered light from the foreign object through the mesh. The rods 61$a$ to 61$e$ can be translated in the transverse direction, the rods 61$f$ to 61$j$ can be translated in the longitudinal direction, and a size of the mesh can be adjusted by changing intervals between the rods 61$a$ to 61$e$ and intervals between the rods 61$f$ to 61$j$. The spatial filter unit 61 is combined with a band-pass filter, which transmits only light of a wavelength (405 nm) to be detected by the dark-field light sensor 63, when necessary.

FIG. 7 is a schematic diagram illustrating an example of the pattern formed on the sample 1. In the drawing, the visual field 1$ijk$ of the illumination and detection optical unit 4 is shown. On the surface of the sample 1, regular patterns such as contact patterns 10$aa$ to 10$ad$, 10$ba$ to 10$bd$, 10$ca$ . . . illustrated in the drawing are formed, and diffracted light from the patterns deteriorates the sensitivity of dark-field detection of the foreign object. The contact pattern is a copper pattern for conduction, and is often arranged in a staggered pattern. In the example in the drawing, groups of the contact patterns 10$aa$ to 10$ad$, 10$ba$ to 10$bd$, 10$ca$ . . . arranged in a row in the X direction are arranged at a fixed pitch in the Y direction, and the arrangement of the contact patterns is shifted by ½ pitch in the X-axis direction between the rows adjacent in the Y direction. In the sample 1 on which the patterns are formed as described above, a portion on which the pattern is not formed is generally covered with a transparent film 11 of optically transparent silicon dioxide related to illumination light used for foreign object inspection. An object to be detected by the dark-field optical unit 6 is a foreign object 12 existing in the transparent film 11 at the portion where the pattern is not formed.

By blocking the diffracted light from the pattern by the rods 61$a$ to 61$f$ of the spatial filter unit 61 shown in FIG. 6, deterioration of the foreign object inspection sensitivity due to the diffracted light from the pattern in restricted. An optical path of the diffracted light changes depending on the wavelength of the illumination light. By combining the band-pass filter, the object to be blocked by the rods 61$a$ to 61$f$ is reduced to only the diffracted light of the wavelength transmitting through the spatial filter unit 61, and thus position adjustment of the rods 61$a$ to 61$f$ is facilitated. Although not shown, a camera for monitoring the light transmitting through the spatial filter unit 61 and a movable mirror for switching the optical path of the light transmitting through the spatial filter unit 61 toward the camera are provided, whereby the adjustment of the rods 61$a$ to 61$f$ can be further facilitated.

7. Signal Processing Device 7

The signal processing device 7 is, for example, a computer, and executes functions of dark-field data processing 71, interference data processing 72, and processing result integration 73.

7-1: Dark-Field Data Processing 71

The signal processing device 7 receives image data from the dark-field light sensor 63 and sequentially stores the image data in a memory. In the dark-field data processing 71, images of the same design portions of the sample 1 are compared with each other, and a coordinate region having a large difference in data (for example, exceeding a threshold) is determined as a defect. As the processing contents of the dark-field data processing 71, for example, die comparison, cell comparison, and die and cell hybrid comparison using the die comparison and the cell comparison in combination disclosed in the description of U.S. Pat. No. 7,889,911 can be applied. The cell comparison is known as a method of detecting a defect by comparing images of positions shifted by a cell pitch (that is, positions of the same design) in a memory cell in which the same pattern is repeatedly formed. The contact pattern illustrated in FIG. 7 is the same as the memory cell in that the same pattern is repeatedly formed, and a defect detection algorithm for the cell comparison and the like can be applied to the defect inspection of the sample 1, on which the contact pattern is formed, without any problem.

7-2. Interference Data Processing 72

The interference data processing 72 is processing of calculating the surface height of the sample 1. Since the portion of the copper contact pattern and the portion of the silicon dioxide transparent film are on the surface of the sample 1, in the interference data processing 72, surface heights of both the portions of the contact pattern and the silicon dioxide transparent film are calculated.

FIG. 8 is a cross-sectional view of the sample 1 taken along a cross-sectional line VIII in FIG. 7. As illustrated in the drawing, the sample 1 has a configuration in which the transparent film 11 of silicon dioxide is formed on a silicon substrate 14 made of silicon, and the contact patterns 10$aa$ to 10$ad$ formed on the surface are embedded in the transparent film 11. In the example in FIG. 8, an internal pattern 13 made of copper exists in a deeper part (in the vicinity of the silicon substrate 14) than the contact patterns 10$aa$ to 10$ad$.

In the inspection of the sample 1 illustrated in FIGS. 7 and 8, the illumination light incident on the sample 1 from the objective lens 43 is incident on the contact patterns 10$aa$ to 10$ad$ or the transparent film 11. The illumination light incident on the contact patterns 10$aa$ to 10$ad$ is reflected by surfaces of the contact patterns 10$aa$ to 10$ad$ and condensed by the objective lens 43. The illumination light incident on the transparent film 11 transmits through the transparent film 11 and reaches the internal pattern 13 in the transparent film 11 or the silicon substrate 14 under the film, and reflected light thereof is condensed by the objective lens 43.

(1) Surface Height of Pattern

First, the light incident on the contact patterns 10$aa$ to 10$ad$ is considered. The contact patterns 10$aa$ to 10$ad$ are made of copper and exposed on the surface of the transparent film 11. A phase difference generated at the surfaces of the contact patterns 10$aa$ to 10$ad$ is defined as Δh, amplitude reflectance of the sample surface is defined as R, and a phase difference generated at the reflecting mirror 45 is defined as Δh2. For the sake of simplicity, it is assumed that reflectance of the reflecting mirror 45 is 1 and the illumination light incident on the quarter-wavelength plate 42 is P polarized light. In this case, the following relational expressions (2) are established for light amounts of light beams having the wavelength λ detected by the interference light sensors 55A, 55B, 55C, and 55D, that is, I1 (λ), I2 (λ), I3 (λ), and I4 (λ).

$$\begin{bmatrix} I1(\lambda) \\ I2(\lambda) \end{bmatrix} = \frac{1}{8}\begin{bmatrix} 2R\cos(\Delta h2(\lambda) - \Delta h1(\lambda)) + R^2 + 1 \\ -2R\cos(\Delta h2(\lambda) - \Delta h1(\lambda)) + R^2 + 1 \end{bmatrix} \quad \text{[Formula 2]}$$

$$\begin{bmatrix} I3(\lambda) \\ I4(\lambda) \end{bmatrix} = \frac{1}{8}\begin{bmatrix} 2R\sin(\Delta h2(\lambda) - \Delta h1(\lambda)) + R^2 + 1 \\ -2R\sin(\Delta h2(\lambda) - \Delta h1(\lambda)) + R^2 + 1 \end{bmatrix} \quad \text{[Formula 3]}$$

The following relational expression is obtained from the above two formulas.

$$\Delta h2(\lambda)-\Delta h1(\lambda)=\mathrm{atan2}(I3(\lambda)-I4(\lambda),\ I1(\lambda)-I2(\lambda)) \quad \text{[Formula 4]}$$

FIG. 9 is a graph illustrating a relation between the light amounts detected by the interference light sensors 55A, 55B, 55C, and 55D and surface heights of the contact patterns 10*aa* to 10*ad* when illumination light having a wavelength of 405 nm is incident on the surfaces of the contact patterns 10*aa* to 10*ad*. In the graph, an X axis represents the surface height of the contact patterns 10*aa* to 10*ad*, and a Y axis represents the light amount. A light amount 801 is the detected light amount I1 (λ) by the interference light sensor 55A, a light amount 802 is the detected light amount I2 (λ) by the interference light sensor 55B, a light amount 803 is the detected light amount I3 (λ) by the interference light sensor 55C, and a light amount 804 is the detected light amount I4 (λ) by the interference light sensor 55D.

FIG. 10 is a graph illustrating a relation between estimated values and actual values of the surface heights of the contact patterns 10*aa* to 10*ad* calculated according to the relational expression of [Formula 4] based on the light amounts in FIG. 9 obtained by the measurement. An X axis in FIG. 10 is equal to the X axis in FIG. 9, and represents the height of the contact patterns 10*aa* to 10*ad* used for measurement. A Y axis in FIG. 10 represents the surface height of the contact patterns 10*aa* to 10*ad* calculated according to [Formula 4]. An estimated value 901 of the surface height is obtained as shown in the graph. In the inspection device 100, since the phases are shifted on both the illumination side and the detection side, a detection range is ½ of the wavelength 405 nm of the illumination light. In the estimated value 901, there is a portion where the value changes discretely and significantly at a half period of the wavelength 405 nm. However, if a hypothesis that the surfaces of the contact patterns 10*aa* to 10*ad* are smooth holds, with respect to the estimated value 901 having periodicity, the graph can be regarded as being linearly connected by performing offset correction on the portion, where the value changes discretely, by the amount corresponding to a step. As illustrated in FIG. 10, the surface heights of the contact patterns 10*aa* to 10*ad* can be accurately obtained based on the measured light amounts.

FIG. 11 is a graph illustrating a relation between the light amounts detected by the interference light sensors 55A, 55B, 55C, and 55D and the surface heights of the contact patterns 10*aa* to 10*ad* when illumination light having a wavelength of 660 nm is incident on the surfaces of the contact patterns 10*aa* to 10*ad*. Measurement conditions in FIG. 11 are the same as those in the measurement in FIG. 9 except that the wavelength of the illumination light is 660 nm. Light amounts 1001 to 1004 are light amounts obtained by the interference light sensors 55A to 55D, respectively. FIG. 12 is a graph illustrating a relation between estimated values and actual values of the surface heights of the contact patterns 10*aa* to 10*ad* calculated according to the relational expression of [Formula 4] based on the light amounts in FIG. 11 obtained by measurement. When an estimated value 1006 in FIG. 12 is compared with the estimated value 901 in FIG. 10, it can be seer that the position where the value changes discretely is different due to the difference in the wavelength of the illumination light, and that the surface heights of the contact patterns 10*aa* to 10*ad* are accurately obtained based on the measured light amounts. In this way, a dynamic range can be greatly increased by using the measured light amounts of a plurality of illumination light beams having different wavelengths.

(2) Surface Height of Transparent Film Having Fixed Film Thickness

Next, the light incident on the transparent film 11 is considered. In order to obtain the surface height of the transparent film 11, the refractive index of the transparent film 11 needs to be known in advance. When the refractive index of the transparent film 11 with respect to the illumination light having the wavelength λ is defined as n1 (λ), a distance (film thickness) D (λ) to a reflector inside or under the transparent film 11 is calculated according to the following formula.

$$D(\lambda)=\frac{\lambda}{4\pi n_1(\lambda)}(\sigma\,\mathrm{acos}\,\alpha(\lambda)+2m_D\pi) \quad \text{[Formula 5]}$$

Reflectance of a boundary between the air and the transparent film is defined as ρ01 (λ), and reflectance of a boundary between the transparent film and the reflector in the transparent film is defined as ρ12 (λ). Based on the measured light amounts I1 (λ) to I4 (λ), a reflected light amount a (λ) is obtained as follows based on [Formula 2] to [Formula 4].

$$R(\lambda)^2=2(I1(\lambda)+I2(\lambda)+I3(\lambda)+I4(\lambda))-1 \quad \text{[Formula 6]}$$

$$\alpha(\lambda)=\frac{(1+\rho_{01}^2(\lambda)\rho_{12}^2(\lambda))R(\lambda)^2-(\rho_{01}^2(\lambda)+\rho_{12}^2(\lambda))}{2\rho_{01}(\lambda)\rho_{12}(\lambda)(1-R(\lambda)^2)} \quad \text{[Formula 7]}$$

When a is 1 or −1, $m_D$ is an integer value, and mh is an integer, the surface height of the transparent film 11 is obtained as follows.

$$h(\lambda)=\frac{\lambda}{4\pi}\mathrm{atan}\,2(\beta\sin(\Delta h1-\Delta h2)+\sigma\gamma\cos(\Delta h1-\Delta h2),\ \beta\cos(\Delta h1-\Delta h2)-\sigma\gamma\sin(\Delta h1-\Delta h2)+2m_h\pi) \quad \text{[Formula 8]}$$

$$\beta(\lambda)=-\rho_{01}(\lambda)\rho_{12}^2(\lambda)-\rho_{01}(\lambda)-\rho_{12}(\lambda)(\rho_{01}^2(\lambda)+1)\alpha(\lambda) \quad \text{[Formula 9]}$$

$$\gamma(\lambda)=(\rho_{01}^2(\lambda)\rho_{12}(\lambda)-\rho_{12}(\lambda))\sqrt{1-\alpha(\lambda)^2} \quad \text{[Formula 10]}$$

FIG. 13 is a graph illustrating a relation between the light amounts detected by the interference light sensors 55A, 55B, 55C, and 55D and the surface height of the transparent film 11 when illumination light having a wavelength of 405 nm is incident on the surface of the transparent film 11 having a fixed film thickness. In the graph, an X axis represents the surface height of the transparent film 11, and a Y axis represents the light amount. A light amount 1101 is the detected light amount I1 (λ) by the interference light sensor 55A, a light amount 1102 is the detected light amount I2 (λ) by the interference light sensor 55B, a light amount 1103 is the detected light amount I3 (λ) by the interference light sensor 55C, and a light amount 1104 is the detected light amount I4 (λ) by the interference light sensor 55D.

FIG. 14 is a graph illustrating estimated values of the film thickness of the transparent film 11 calculated according to the relational expression of [Formula 5] based on the light amounts in FIG. 13 obtained by the measurement. As shown in the graph, it can be seen that two estimated values 1201 and 1202 are obtained based on the detected light amounts.

FIG. 15 is a graph illustrating an estimated value of the surface height of the transparent film 11 calculated according to the relational expression of [Formula 8] based on the light amounts in FIG. 13 obtained by the measurement. As shown in the graph, it can be seen that two estimated values 1301 and 1302 are obtained.

FIG. 16 is a graph illustrating a relation between the light amounts detected by the interference light sensors 55A, 55B, 55C, and 55D and the surface height of the transparent film 11 having a fixed film thickness when illumination light having a wavelength of 660 nm is incident on the surface of the transparent film 11. Light amounts 1401 to 1404 are the I1 (λ) to I4 (λ), respectively.

FIG. 17 is a graph illustrating estimated values of the film thickness of the transparent film 11 calculated according to the relational expression of [Formula 5] based on the light amounts in FIG. 16 obtained by the measurement. Two estimated values 1501 and 1502 are obtained based on the detected light amounts. FIG. 18 is a graph illustrating estimated values of the surface height of the transparent film 11 calculated according to the relational expression of [Formula 8] based on the light amounts in FIG. 16 obtained by the measurement. When estimated values 1601 and 1602 in FIG. 18 are compared with the estimated values 1301 and 1302 in FIG. 15, it can be seen that there is a common solution in two solutions obtained for each different wavelength. Specifically, the estimated values 1301 and 1601 coincide with each other. Accordingly, it can be seen that, with respect to the surface height of the transparent film 11, an accurate value can be obtained by selecting a common solution in two solutions obtained for each of a plurality of wavelengths.

(3) Surface Height of Transparent Film Having Change in Film Thickness

FIG. 19 is a graph illustrating a relation between the light amounts detected by the interference light sensors 55A, 55B, 55C, and 55D and the surface height of the transparent film 11, whose film thickness changes, when the illumination light is incident on the surface of the transparent film 11. In the graph, an X axis represents the film thickness of the transparent film 11, and a Y axis represents the light amount. In this example, the surface height of the transparent film 11 is assumed to be fixed. A light amount 1701 is the detected light amount I1 (λ) by the interference light sensor 55A, a light amount 1702 is the detected light amount I2 (λ) by the interference light sensor 55B, a light amount 1703 is the detected light amount I3 (λ) by the interference light sensor 55C, and the light amount 1704 is a detected light amount I4 (λ) by the interference light sensor 55D. The detected light amount has a luminance change in a trigonometric functional form with respect to a height change in FIGS. 9, 11, 13, and 16, whereas the detected light amount has a complicated luminance change with respect to a change in film thickness in FIG. 19.

FIG. 20 is a graph illustrating estimated values of the film thickness of the transparent film 11 calculated according to the relational expression of [Formula 5] based on the light amounts in FIG. 19 obtained by the measurement. Two estimated values 1801 and 1802 are obtained based on the detected light amounts. FIG. 21 is a graph illustrating estimated values of the surface height of the transparent film 11 calculated according to the relational expression of [Formula 8] based on the light amounts in FIG. 19 obtained by the measurement. Two estimated values 1901 and 1902 are obtained based on the detected light amounts. In the inspection device 100, the interference light sensors 55A to 55D simultaneously obtain detected light amounts of three illumination light beams having different wavelengths. That is, in each of the interference light sensors 55A to 55D, data for a wavelength of 532 nm and data for a wavelength of 660 nm are obtained simultaneously with data for a wavelength of 405 nm.

FIG. 22 is a graph illustrating profiles of all detected light amounts obtained by the interference light sensors 55A to 55D when the film thickness of the transparent film 11 is changed. FIG. 23 is a graph illustrating estimated values of the film thickness of the transparent film 11 calculated according to the relational expression of [Formula 5] based on the light amounts in FIG. 22 obtained by the measurement. FIG. 24 is a graph illustrating estimated values of the surface height of the transparent film 11 calculated according to the relational expression of [Formula 8] based on the light amounts in FIG. 22 obtained by the measurement. For each of the film thickness and the surface height, two estimated values are calculated for each different wavelength, and four estimated values of the surface height are obtained for any value on the X axis as shown in FIG. 24. This indicates that some estimated values coincide with each other at different wavelengths. In this manner, a plurality of calculated surface heights or transparent film thicknesses can be calculated by performing voting by comparing the surface heights calculated from a plurality of wavelengths.

In order to obtain the surface height and the film thickness of the transparent film 11, the refractive index, that is, the material of the transparent film 11 needs to be grasped in advance. In the above description, the reflectance of ρ01 and ρ12 at the boundary is used, and can be calculated based on the refractive index. Also in this case, the material can be identified by voting in the same manner. Although the material of a measurement portion in the measurement sample cannot be clearly grasped, in the evaluation of the manufacturing process of the semiconductor wafer or the like, it is assumed that the sample 1 is made of several materials such as silicon dioxide, copper, and silicon. For example, the material of the transparent film 11 is limited to silicon dioxide, and as the material of the surface of the sample 1, there are two options, that is, silicon dioxide and copper. As the material reflecting light incident on the transparent film 11, there are two options, that is, copper and silicon. On the assumption of such options, the surface height of the sample 1 and/or the film thickness of the transparent film 11 based on the detected light amount are calculated at the refractive index for each option, and estimated values calculated for each material selection setting are compared. In the inspection portion for which the option coincides with the actual material, since some estimated values are common at a plurality of wavelengths as illustrated in FIG. 24, the material can be specified based on a voting result of identity.

(4) Calculation Procedure

FIG. 25 is a flowchart illustrating a procedure of calculating the surface height and the film thickness of any measurement portion of the sample 1 according to the interference data processing 72.

First, Step 1 is a loop for the wavelength of light used for measurement, and the signal processing device 7 repeats the procedure of Steps 2 to 5 by sequentially switching the wavelength of light for any measurement coordinates P1. In the embodiment, since there are three types of wavelengths of light, that is, 405 nm, 532 nm, and 660 nm, the number of repetitions of Step 1 is 3.

In Step 2, under conditions of the wavelength set in Step 1, the signal processing device 7 calculates the surface height in a case where it is assumed that the surface of the measurement coordinates P1 is not silicon dioxide (transparent film 11), that is, the surface is the same (contact pattern). The calculation method is as described above.

Step 3 is a loop for options of the transparent film 11 assuming that the measurement coordinates P1 are the transparent film 11. In the case of a semiconductor substrate or the like, the material of the transparent film 11 assumed in a measurement stage by the inspection device 100 is often limited to silicon dioxide, and in the embodiment, the option of the material of the transparent film 11 set in Step 3 is limited to silicon dioxide. Therefore, the number of repetitions of Step 2 is 1.

Step 4 is a loop for options of the material in the film or under the film on which the illumination light is reflected, assuming that the measurement coordinates P1 are the transparent film 11. Since the material in the film at the measurement coordinates P1 is not known in advance, a plurality of materials such as copper and silicon are assumed as the options.

In Step 5, the signal processing device 7 calculates the film thickness and the surface height by using [Formula 5] to [Formula 10] based on the wavelength set in Step 1, the refractive index of the transparent film 11 set in Step 3, and the refractive index of the material set in Step 4. Here, for example, the surface height of the transparent film is calculated using a plurality of estimated values as candidates based on the presence of the indefinite mh or the a of 1 or −1 as described above.

After calculating the estimated values of the film thickness and the surface height for all the combinations of the options in Step 1, Step 3, and Step 4, the signal processing device 7 shifts the procedure to Step 6. Step 6 is a loop for the estimated values (candidates) of the film thickness and the surface height calculated in Step 1 to Step 5, and Step 7 is a loop for the wavelengths of light used for the measurement. In Step 8, the signal processing device 7 calculates a reflected light intensity based on the settings in Step 6 and Step 7. The reflected light intensity is determined by reflected light from the reflecting mirror 45, reflected light from the surface of the transparent film 11, reflected light from the non-transparent material in the film, and multiple reflected light from the surface of the transparent film 11 and the surface of the non-transparent material. Particularly in the embodiment, the signal processing device 7 calculates, based on the estimated value set in Step 6, the reflected light intensity for a wavelength λb different from a wavelength λa related to the estimated value in Step 8. Then, in subsequent Step 9, the signal processing device 7 compares the reflected light intensity calculated in Step 8 with the detected light amount obtained at the wavelength λb. To give a specific example, for example, cross-validation for calculating the reflected light intensity to be obtained for light having a wavelength of 660 nm is executed, for example, by using estimated values of the film thickness and the surface height calculated based on the detected light amount of light having a wavelength of 405 nm. If the estimated values of the film thickness and the film surface height are equal to the actual values, the estimated value of the reflected light intensity and the detected light amount coincide with each other in Step 9.

After executing the processing of Step 9 for all the wavelengths in relation to the estimated values of the film thickness and the surface height set in Step 6, the signal processing device 7 calculates an integrated evaluation value for all the wavelengths in Step 10. As an algorithm in Step 10, for example, an example of comparing differences between the reflected light intensity (calculated value) and the detected light amount calculated in Step 9 and calculating the maximum difference as the evaluation value for each wavelength can be adopted. As the evaluation value, a value known in a statistical method such as an average value or a median value can be appropriately adopted additionally. As an algorithm in Step 11, an example of selecting the minimum value of the evaluation values calculated in Step 10 and determining estimated values of the film thickness and the surface height related to the minimum evaluation value as measured values of the film thickness and the surface height at the coordinates P1 can be adopted.

When the loop of Step 6 is finished and the evaluation value in Step 10 is calculated for each estimated value, the signal processing device 7 shifts to Step 11, extracts estimated values of the film thickness and the surface height at which the evaluation value is the most satisfactory, and determines the estimated values as the measured values of the film thickness and the surface height at the coordinates P1.

Although the method of calculating the reflected light intensity and performing the cross-validation is described in the example in FIG. 25, it is also possible to adopt an algorithm of comparing the estimated values of the surface height and the film thickness calculated in Step 5 between different wavelengths to evaluate the consistency, and determining the most commonly calculated estimated value as the measured value. FIG. 26 is a flowchart illustrating another example of the calculation procedure of the surface height and the film thickness using the algorithm.

In FIG. 26, Step 1 to Step 5 are the same processing as Step 1 to Step 5 in FIG. 25. After calculating the estimated values of the film thickness and the surface height for all the combinations of the options in Step 1, Step 3, and Step 4, the signal processing device 7 shifts the procedure to Step 20. Step 20 is a loop for estimated values (candidates) of the surface height and the film thickness calculated using a specific wavelength λ1. For example, when the specific wavelength is 405 nm, for an estimated value calculated based on a detected light amount using the light having the wavelength of 405 nm on the assumption that the transparent film 11 is formed on the sample surface, the material of the transparent film 11 and a reflecting substance in the film is set as a condition. The setting of this condition is repeated by the number of pairs of the surface height and the film thickness calculated based on the detected light amount using the light having the wavelength of 405 nm.

Step 21 is a loop for a wavelength λ2 of light used other than the specific wavelength λ1. For example, it is assumed that the specific wavelength λ1=404 nm is set in Step 20, and in the case of the embodiment, 532 nm and 660 nm are sequentially set as the wavelength λ2 in Step 21.

In Step 22, the signal processing device 7 selects, from among estimated values of the surface height and the film thickness calculated for the wavelength λ2 regarding the material set in Step 20, estimated values of the surface height and the film thickness closest to estimated values of the surface height and the film thickness calculated for the light of the specific wavelength λ1. As an example, the examples in FIGS. 14, 15, 17, and 18 described above may be referred to. In this case, among the estimated values 1501, 1502, 1601, and 1602 of the film thickness and the surface height at the wavelength λ2 (660 nm), the estimated values 1501 and 1601 are closest to the estimated values 1201 and 1301 of the film thickness and the surface height at the specific wavelength λ1 (405 nm) under the same material assumption. Under the material assumption in FIGS. 14, 15, 17, and 18, in Step 22, the estimated values 1501 and 1601 are selected as measured value candidates of the film thickness and the surface height for the wavelength λ2. The selection of such measured value candidates is executed for all the wavelengths (532 nm and 660 nm in this example) (Step 23, loop (g)).

In Step 23, for the material set in Step 20, the signal processing device 7 sets, as the evaluation value for the material, a value at which the deviation from the estimated value for the specific wavelength λ1 compared with the measured value candidate in Step 22 is maximum from the measured value candidates obtained in Step 22 for each wavelength λ2. If the assumption of the material is correct, the measured value candidate coincides with the estimated value for the specific wavelength λ1 regardless of the wavelength λ2. If the assumption of the material is wrong, at least one of the measured value candidates selected for each wavelength λ2 deviates from the estimated value for the specific wavelength λ1.

When the evaluation value in Step 23 is determined for each material set in Step 20, the signal processing device 7 shifts the procedure to Step 24. In Step 24, the signal processing device 7 selects the best value from the evaluation values determined in Step 23 for each material, determines the material assumption related to the best value as an appropriate assumption, and determines measured values candidate related to the appropriate assumption as the measured values of the film thickness and the surface height at the coordinates P1.

(5) Defect Determination

FIG. 27 is a block diagram illustrating an example of a functional block for defect inspection of the sample 1 by the signal processing device 7.

In the inspection device 100, by the product of four different polarized light beams and three different wavelengths, 12 pieces of image data are input to the signal processing device 7 for the same region. The signal processing device 7 calculates measured values of the sample surface height and the film thickness based on interference data in processing 7201. In the processing 7201, specifically, the algorithm described in FIG. 25 or FIG. 26 can be adopted.

In subsequent processing 7202, the signal processing device 7 corrects the measured values of the sample surface height and the film thickness according to a height variation of the sample 1. Since the measured value is on the nanometer order, the measured value of the sample surface height changes due to a holding state or the like of the sample 1. Therefore, a difference between a representative value of height in the vicinity of the measurement coordinates of the sample 1 and the measured value of the surface height is calculated, and the measured value is corrected using the calculated difference as a correction value. As the representative value of height, for example, an average value or a median value of height of a predetermined region of the sample 1 including the measurement coordinates, or a value of height filtered by a low-frequency transmission filter can be used. The signal processing device 7 stores data on the corrected surface height of the sample 1 in the memory in processing 7203. The data includes data on a surface material (silicon dioxide, copper, or the like) for each coordinate of the sample 1.

Next, in processing 7204, the signal processing device 7 performs abnormality determination for the surface of the sample 1. As a method of abnormality determination, it is possible to determine an abnormality by determining whether the measured value of the corrected surface height stored in the memory in processing 7203 falls within an appropriate height range (set values). The invention is not limited to the comparison with set values, and a method of comparing corrected surface heights of portions having the same design in the same chip and determining an abnormality based on whether the difference falls within an appropriate range can be applied. A method of comparing corrected surface heights of the same positions of different samples 1, or comparing corrected surface heights of corresponding positions of different chips in the same sample 1, and determining an abnormality based on whether the difference falls within an appropriate range can also be applied. A method combining these methods is also applicable.

Further, based on the obtained data, the signal processing device 7 extracts a feature of a determined region in processing 7205. Here, examples of the feature to be extracted include roughness of the surface of the region determined to be abnormal in the processing 7204 and a variation in height (average height, maximum height, minimum height, and the like). The roughness can be obtained from a scattered light signal other than a foreign object signal measured by the dark-field light sensor 63. In addition, for example, an average value or a maximum value of a step between the contact pattern (a portion where the surface material is estimated to be copper) and the transparent film 11 (a portion where the surface material is estimated to be silicon dioxide) can be calculated. With respect to the step, data on whether the step is positive or negative, that is, which of the contact pattern and the transparent film is higher can be obtained.

7-3. Processing Result Integration 73

In the processing of the processing result integration 73, the signal processing device 7 outputs, for example, coordinates at which the surface height is out of the appropriate range and coordinates at which the foreign object 12 is detected, based on the data obtained in the interference data processing 72 and the dark-field data processing 71. In addition, the signal processing device 7 can store the measured values of the surface height of the sample and the film thickness in the memory device 84, and can display, on the monitor 83, a map of the sample surface height of a region designated by an operation, for example, according to an operation on the UI 82 by a user.

FIG. 28 is a diagram illustrating an example of an output screen. FIG. 28 illustrates a case where the sample 1 is a semiconductor wafer. A detected defect 8302 is displayed on a map 8301 of the sample 1. Further, on the screen in FIG. 28, a surface height map 8304 of a designated region 8303 designated by the user in the map 8301 is enlarged and displayed in a display format in which display colors and shades are different according to the height. By operating cross-sectional lines 8306 and 8307 extending longitudinally and transversely in the surface height map 8304 to move the sample 1 to a desired position, cross-sectional waveforms 8308 and 8309 of the sample 1 at the desired portion in the surface height map 8304 are displayed. Further, by operating and moving a frame 81305 to a desired position in the surface height map 8304, data 8310 on a feature of a region designated by the frame 8305, for example, data on the maximum height, the minimum height, and the variance of the height in the region of the frame 8305 is displayed.

8. Effects (1) According to the embodiment, by using the interference light as described above, the surface height and the thickness of the transparent film 11 having low reflectance can be measured with high throughput by one scan without being affected by reflection from the copper wiring or the like existing in the optically transparent film. As described above, in a manufacturing line of a semiconductor substrate, a thin film substrate, or the like, the film thickness and the surface height of the transparent film on the substrate surface can be accurately measured at high speed.

(2) As described with reference to FIGS. 17 and 18, the surface height and the film thickness of the transparent film 11 cannot be uniquely calculated based on the detected light amount of the interference light. On the other hand, in the embodiment, the interference light sensors 55A to 55D simultaneously detect interference light having different wavelengths, and the estimated values of the surface height and the like calculated for each wavelength are collated, whereby a highly reliable measured value can be inferred from a plurality of estimated values. Since the estimated values to be collated are calculated according to the cases of the candidate material of the beam spot, the candidate material of the beam spot is also identified accompanying the determination of the measured value.

(3) Further, it is also possible to determine a defect such as a film thickness abnormality based on data on the measured surface height and film thickness of each portion of the sample 1.

(4) By dispersing and extracting the dark-field light from the interference light, the defect inspection of a foreign object or the like on the surface of the sample 1 can be simultaneously performed with high accuracy.

Second Embodiment

FIG. 29 is a schematic view illustrating a configuration example of an inspection device according to a second embodiment of the invention. In FIG. 29, the same or corresponding elements as those of the inspection device 100 according to the first embodiment are denoted by the same reference signs as those in FIG. 1, and the description thereof will be appropriately omitted.

9. Illumination Optical Unit 3

In the embodiment, a laser light source that emits white light is used as the light source 30 instead of a multiline laser light source that emits monochromatic light of three colors individually. The inspection device 100 according to the first embodiment employs a configuration in which a flat Gaussian beam is operated by the optical scanning unit 33, and the inspection device 100 according to the second embodiment employs a configuration in which an isotropic Gaussian beam is emitted. Therefore, the illumination shaping unit 31 (FIG. 1) using the anamorphic prism is replaced with a beam expander 37. Accordingly, the optical scanning unit 33 (FIG. 1) is not necessary, and is omitted in the embodiment.

10. Beam Expander 37

The beam expander 37 is a unit configured to enlarge a beam diameter of incident illumination light and includes a plurality of lenses 37*a* and 37*b*. FIG. 29 illustrates a Galileo beam expander 37 in which a concave lens is used as the lens 37*a* and a convex lens is used as the lens 37*b*. The beam expander 37 is provided with an interval adjustment mechanism (zoom mechanism) for the lenses 37*a* and 37*b*, and an enlargement ratio of the beam diameter is changed by adjusting an interval between the lenses 37*a* and 37*b*. The enlargement ratio of the beam diameter by the beam expander 37 is about 5 times to 10 times, and in this case, when the beam diameter of the illumination light emitted from the laser light source 30 is 1 mm, a beam system of the illumination light is enlarged to about 5 mm to 10 mm. When the illumination light incident on the beam expander 37 is not a parallel beam, the illumination light can be collimated (quasi-parallelization of the beam) together with the beam diameter by adjusting the interval between the lenses 37*a* and 37*b*. However, in collimating the beam, a configuration of providing a collimating lens upstream of the beam expander 37 separately from the beam expander 37 may be used. The illumination light passing through the beam expander 37 is guided to the illumination and detection optical unit 4 through an illumination lens 38.

11. Illumination and Detection Optical Unit 4

The illumination light entering the polarized beam splitter 41 via the illumination lens 38 and the quarter-wavelength plate 42 is split into two orthogonal polarized light beams by the polarized beam splitter 41. One of the split light beams is circularly polarized by the quarter-wavelength plate 46 whose fast axis or slow axis is rotated by 45°, and is irradiated to the sample 1 via the objective lens 43. Reflected light from the sample 1 is incident on the quarter-wavelength plate 46 again, has its polarization shifted by 90° from that of the illumination light incident from the polarized beam splitter 41, transmits through the polarized beam splitter 41 and is guided to the interference optical unit 5 and the dark-field optical unit 6 via relay lenses 48*a* and 48*b*. The other light beam split by the polarized beam splitter 41 is circularly polarized by a quarter-wavelength plate 47 whose fast axis or slow axis is rotated by 45°, and is irradiated to the reflecting mirror 45 via the objective lens 44. Reflected light from the reflecting mirror 45 is incident on the quarter-wavelength plate 47 again and has its polarization shifted by 90° from that of the illumination light entering from the polarized beam splitter 41. The reflected light whose polarization is shifted by 90° is reflected by the polarized beam splitter 41, and is guided to the interference optical unit 5 and the dark-field optical unit 6 via the relay lenses 48*a* and 48*b*. In this way, interference light of the reflected light from the sample 1 and the reflecting mirror 45 is guided to the interference optical unit 5 and the dark-field optical unit 6 via the relay lenses 48*a* and 48*b*.

12. Interference Optical Unit 5

The interference optical unit 5 is different from that of the inspection device 100 in FIG. 1 in that the interference light sensors 55A to 550 which are TDI sensors are changed to interference light sensors 56A to 56D which are 2D sensors. FIG. 30 is a schematic diagram of the interference light sensors 56A to 56D. FIG. 31 is a schematic diagram of a light receiving element array provided in the interference light sensors 56A to 56D. As illustrated in FIG. 22A, each of the interference light sensors 56A to 56D is a three-plate camera, and includes three light receiving element arrays 56*r*, 56*g*, and 56*b* that detect light having wavelengths of 660 nm, 532 nm, and 405 nm, respectively. The interference light incident on the interference light sensors 56A to 56D is dispersed into light beams having wavelengths of 660 nm, 532 nm, and 405 nm by three prisms, respectively, and incident on the light receiving element arrays 56*r*, 56*g*, and 56*b*. The light receiving element arrays 56*r*, 56*g*, and 56*b* each include a large number of light receiving elements arranged two-dimensionally as illustrated in FIG. 31.

The other configurations of the embodiment are the same as those of the second embodiment. In the first embodiment, the multiline laser light source is used to use a plurality of illumination light beams having different wavelengths. In the embodiment, although a configuration is adopted in which normal illumination light is used and interference light is dispersed according to the wavelength in the process of being guided to the light receiving element arrays 56*r*, 56*q*, and 56*b*, the same effects can be obtained.

Third Embodiment

The inspection device 100 according to the first embodiment and the second embodiment employs a scanning method in which the stage 2 repeats the step-and-repeat operation. In contrast, in the embodiment, the stage 2 continuously operates at a fixed speed and the entire surface of the sample 1 is scanned without stopping. The inspection device 100 according to the embodiment includes a unit configured to adjust an incident angle of illumination light with respect to the sample.

13. Illumination Optical Unit 3

FIG. 32 is a schematic diagram illustrating a configuration example of an inspection device according to the second embodiment of the invention. In FIG. 32, the same or corresponding elements as those of the inspection device 100 according to the first embodiment or the second embodiment are denoted by the same reference signs as those in FIG. 1 or FIG. 29, and the description thereof will be appropriately omitted.

The inspection device 100 according to the embodiment includes an illumination incident angle adjustment unit 39 including mirrors 39*a* and 39*b*. The illumination incident angle adjustment unit 39 changes an illumination angle of the illumination light shaped flat by the illumination shaping unit 31. The illumination angle is adjusted by driving and moving the mirror 39*b* by a driving device (not shown) that is driven in accordance with a command from the control device 81. By driving the mirror 39*b*, it is possible to switch between oblique illumination of illuminating the sample 1 from an oblique direction and epi-illumination of illuminating the sample 1 perpendicularly as in the first and second embodiments. The mirror 39*b* is provided at a position conjugate with the pupil planes of the objective lenses 43 and 44. The illumination light reflected by the mirror 39*b* is incident on the quarter-wavelength plate 42 via the relay lenses 34*a* and 34*b*. The light transmitting through the quarter-wavelength plate 42 is split by the polarized beam splitter 41 according to the polarization direction.

The light split by the polarized beam splitter 41 and directed toward the objective lens 43 is irradiated to the sample 1 from an oblique direction by S-polarized illumination to form a beam spot. Reflected light from the sample 1 is condensed by the objective lens 43 and is incident on a half-wavelength plate 46-2 whose fast axis or slow axis is rotated by 45°. The reflected light whose polarization direction is rotated by 90° at the half-wavelength plate 46-2 transmits through the polarized beam splitter 41 and is guided to the interference optical unit 5 and the dark-field optical unit 6 via the relay lenses 48*a* and 48*b*.

On the other hand, the light split by the polarized beam splitter 41 and directed toward the objective lens 44 is incident on a half-wavelength plate 47-2 whose fast axis or slow axis is rotated by 45°, and becomes S-polarized light whose polarization direction is rotated by 90° to form a beam spot on the reflecting mirror 45. Reflected light from the reflecting mirror 45 is condensed by the objective lens 44, reflected at the polarized beam splitter 41, and guided to the interference optical unit 5 and the dark-field optical unit 6 via the relay lenses 48*a* and 48*b* as interference light with the reflected light from the sample 1.

As described above, both the half-wavelength plates 46-2 and 47-2 cover only about half of an effective pupil diameter of the objective lenses 43 and 44, and are configured to transmit only light incident on or light emitted from the objective lenses 43 and 44.

FIG. 33 is a diagram illustrating reflection characteristics of silicon dioxide, and shows a difference in correspondence between an incident angle and reflectance at a surface of a transparent film depending on polarization. An X axis represents the incident angle, and a Y axis represents the reflectance. In order to stably measure the surface height of the sample 1, it is effective to increase the reflectance of the surface of the transparent film as much as possible. A characteristic 2701 represents a reflectance characteristic of S-polarized light, and a characteristic 2702 represents a reflectance characteristic of P-polarized light. It can be seen that when the incident angle is increased, the reflectance of S-polarized light is higher than P-polarized light. Therefore, when forming a beam spot on the sample 1, the illumination light is incident from an oblique direction with S-polarization as in the embodiment, whereby a surface height of the transparent film can be calculated stably.

14. Stage 2

FIG. 34 is a diagram illustrating a scanning trajectory by the stage 2 provided in the inspection device according to the embodiment. In addition to the XY stage, a θ rotation stage (not shown) is mounted on the stage 2 provided in the inspection device 100 according to the embodiment. A rotation speed thereof is set to be synchronized with data transmission speed of the light receiving element of the TDI sensor employed in the interference light sensors 55A to 55D. The sample 1 moves while rotating with respect to the beam spot by a combination of the translation operation by the XY stage and the rotation operation by the ° rotation stage, and as illustrated in FIG. 34, the beam spot moves along a spiral trajectory from the center toward an outer edge of the sample 1, and the entire surface of the sample 1 is scanned. The beam spot moves in an s2 direction by a distance equal to or less than the length of the beam spot in the s2 direction while the sample 1 makes one rotation in an s1 direction.

FIG. 35 is a diagram illustrating another example of the scanning trajectory of the sample 1 in the embodiment. The example in FIG. 35 illustrates a scanning trajectory presented when only the XY stage is driven. In this example, the surface of the sample 1 is scanned with the beam spot in a manner of folding not a spiral trajectory but a linear trajectory. Specifically, the X stage performs translation movement in the s1 direction at a constant speed, the Y stage is driven in the s2 direction by a predetermined distance (for example, a distance equal to or less than the length of the beam spot BS in the s2 direction), and then the X stage turns back in the s1 direction again to perform the translation movement. Accordingly, the entire surface of the sample 1 is scanned with the beam spot by repeating linear scanning in the s1 direction and movement in the s2 direction. Compared with this scanning method, the spiral scanning method illustrated in FIG. 34 allows the inspection of the sample 1 to complete in a shorter time since there is no reciprocating operation.

15. Dark-Field Optical Unit

FIG. 36 is a schematic diagram of the perforated mirror 60 of the dark-field optical unit 6 provided in the inspection device according to the embodiment. FIG. 36 illustrates the perforated mirror 60 having a configuration including two bar mirrors arranged at an interval in the S2 direction.

The beam spots 40*r*, 40*g*, and 40*b* illustrated in FIG. 36 are virtually illustrated for convenience of description of formation on the sample 1, and are not actually formed at the perforated mirror 60 as illustrated in the diagram. Since the beam spots 40*r*, 40*g*, and 40*b* are long in the S2 direction and short in the direction orthogonal to S2, the beam is short in the S2 direction and long in the direction orthogonal to S2 in the perforated mirror 60 provided on a pupil conjugate plane of the objective lenses 43 and 44. Accordingly, interference light from the sample 1 and the reflecting mirror 45 passes through the interval between the two bar mirrors extending in the direction orthogonal to S2, and dark-field light (scattered light) from the sample 1 traveling along an optical path deviated from the beam is reflected by the bar mirrors. Although not particularly described in the first embodiment and the second embodiment, the inspection device 100 according to the first embodiment and the second embodiment can also adopt the perforated mirror 60 having the same configuration as that shown in FIG. 36. In the embodiment, the interval between the two bar mirrors of the perforated mirror 60 can be set large by configuring such that the illumination light is incident on the sample 1 while being inclined in the S2 direction at the time of oblique illumination.

As described above, in the inspection device 100 according to the embodiment, the oblique illumination and the epi-illumination are switched by driving the mirror 39*b*, and the optical path of the illumination light is offset. Accordingly, the optical path of the interference light is also offset. Therefore, the perforated mirror 60 is moved in synchronization with the mirror 39*b* as indicated by an arrow in FIG. 32.

The other configurations of the embodiment are the same as those of the first embodiment or the second embodiment. Also in the embodiment, the same effects as those of the first embodiment and the second embodiment can be obtained. Since the oblique illumination is possible, as described above, the improvement in measurement accuracy of the surface height of the transparent film 11 can be expected, and the inspection accuracy of a defect depending on the dark-field light is also improved.

(Modification)

The invention is not limited to the above-described embodiments, and may include various modifications. For example, the above-described embodiments have been described in detail to facilitate understanding of the invention, and the invention is not necessarily limited to those including all the configurations described above. A part of a configuration according to a certain embodiment can be replaced with a configuration according to another embodiment, and a configuration according to another embodiment can be added to a configuration according to a certain embodiment. A part of a configuration according to each embodiment may be added, deleted, or replaced with another configuration.

A part or all of the configurations, functions, processing, processing units, and the like may be implemented by hardware such as an integrated circuit. The configurations, functions, and the like described above may be implemented by software by a processor interpreting and executing a program for implementing each function. Information such as programs, tables, and files for implementing the respective functions can be stored in various storage media. Examples of the various storage media include recording devices such as a memory, a hard disk, and a solid state drive (SSD), or a flash memory card and a digital versatile disk (DVD).

In the embodiments, signal input and output lines considered to be necessary for description are shown, and not all signal input and output lines in a product are necessarily illustrated. Actually, almost all configurations may be considered to be connected.

REFERENCE SIGNS LIST

1: SAMPLE
7: SIGNAL PROCESSING DEVICE
30: LIGHT SOURCE
43: OBJECTIVE LENS (FIRST OPTICAL UNIT)
44: OBJECTIVE LENS (SECOND OPTICAL UNIT)
41: POLARIZED BEAM SPLITTER (INTERFERENCE OPTICAL UNIT)
45: REFLECTING MIRROR
55A-55D: INTERFERENCE LIGHT SENSOR
55*b*, 55*g*, 55*r*: LIGHT RECEIVING SURFACE
56A-56D: INTERFERENCE LIGHT SENSOR
56*b*, 56*g*, 56*r*: LIGHT RECEIVING SURFACE
60: PERFORATED MIRROR (OPTICAL PATH BRANCH UNIT)
61: SPATIAL FILTER
63: DARK-FIELD LIGHT SENSOR
100: INSPECTION DEVICE

The invention claimed is:

1. An inspection device for inspecting a sample having a surface formed of a transparent film transmitting light and a non-transparent material, the inspection device comprising:
a light source;
a first optical unit configured to irradiate the sample with illumination light emitted from the light source and condense first reflected light reflected by the sample;
a second optical unit configured to illuminate a reflecting mirror with the illumination light and condense second reflected light reflected by the reflecting mirror;
an interference optical unit configured to cause the first reflected light and the second reflected light to interfere with each other to obtain interference light;
a plurality of interference light sensors configured to detect a reflected light intensity of a predetermined polarization component of the interference light; and
a signal processing device configured to process a detected light amount of the interference light sensor, wherein
the signal processing device identifies, based on the detected light amount of the interference light sensor and refractive indices of the transparent film and the non-transparent material, whether any coordinates of the sample indicate any of the transparent film and the non-transparent material, and measures a surface height or a film thickness of the sample at the coordinates by calculation.

2. The inspection device according to claim 1, wherein
the interference light sensor detects reflected light of the illumination light for each light having a different wavelength, and
the signal processing device
calculates one or more estimated values of the surface height or the film thickness based on a detected light amount for each wavelength, and
collates the one or more estimated values for each wavelength, and selects and outputs one of the one or more estimated values calculated for each wavelength as a measured value of the surface height or the film thickness.

3. The inspection device according to claim 1, wherein
the interference light sensor detects reflected light of the illumination light for each light having a different wavelength, and the signal processing device stores at least one refractive index of a candidate material of the transparent film and at least one refractive index of a candidate material of the non-transparent material, assumes one or two candidate materials at the coordinates depending on a case where the illumination light incident on the coordinates is directly reflected by the non-transparent material and a case where the illumination light is reflected by the non-transparent material via the transparent film, calculates one or two estimated values of the surface height or the film thickness for each wavelength, based on a refractive index of the assumed candidate material and a detected light amount for each wavelength obtained individually by the interference light sensor, and collates the estimated value calculated for each wavelength, selects one estimated value from the one or two estimated values calculated for each wavelength, and determines and outputs the one estimated value as a measured value of the surface height or the film thickness.

4. The inspection device according to claim 3, wherein the signal processing device identifies, as a material at the coordinates, a candidate material related to the estimated value determined as the measured value.

5. The inspection device according to claim 3, wherein as processing of collating the estimated values calculated for each wavelength and determining the measured value, the signal processing device calculates a light amount of another wavelength to be detected in order that the estimated value calculated based on the detected light amount for each wavelength is calculated to be equal to an estimated value calculated for the other wavelength for a same candidate material, compares a calculated value of the light amount of the other wavelength with the detected light amount, and determines, as the measured value, an estimated value having a smallest deviation from the calculated value.

6. The inspection device according to claim 3, wherein as processing of collating the estimated value calculated for each wavelength and determining the measured value, the signal processing device compares the estimated values calculated based on different wavelengths for a same candidate material, and identifies, as a material at the coordinates, a candidate material for which the estimated values of all the wavelengths coincide with each other or have a difference equal to or less than an allowable value, and determines the estimated value related to the material as the measured value.

7. The inspection device according to claim 3, wherein the light source emits, as the illumination light, a plurality of monochromatic light beams having different wavelengths, and the interference light sensor includes a plurality of light receiving surfaces for individually detecting reflected light for each wavelength of the illumination light.

8. The inspection device according to claim 3, wherein the interference light sensor includes a plurality of light receiving surfaces for individually detecting reflected light split for each wavelength.

9. The inspection device according to claim 1, wherein the signal processing device measures the surface height of the sample for each predetermined region, determines whether a measurement result falls within a predetermined range, and outputs, as a defect, a region for which the measurement result is out of the predetermined range.

10. The inspection device according to claim 1, wherein four interference light sensors are provided, and the four interference light sensors detect light beams whose polarization directions are shifted by every 45°.

11. The inspection device according to claim 1, wherein the first optical unit illuminates the surface of the sample with the illumination light with S-polarization from an oblique direction.

12. The inspection device according to claim 1, further comprising:

an optical path branch unit configured to split dark-field light from reflected light condensed by the first optical unit and the second optical unit;

a spatial filter configured to remove diffracted light from the dark-field light split by the optical path branch unit; and a dark-field light sensor configured to detect the dark-field light transmitting through the spatial filter, wherein the signal processing device detects a defect of the sample based on an output of the dark-field light sensor.

* * * * *